US011878527B2

(12) United States Patent
Katakura et al.

(10) Patent No.: US 11,878,527 B2
(45) Date of Patent: Jan. 23, 2024

(54) LIQUID DISCHARGING APPARATUS AND LIQUID DISCHARGING METHOD

(71) Applicant: SEIKO EPSON CORPORATION, Tokyo (JP)

(72) Inventors: Takahiro Katakura, Okaya (JP); Takanori Aimono, Matsumoto (JP); Yuta Okawa, Matsumoto (JP); Shotaro Tamai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/660,933

(22) Filed: Apr. 27, 2022

(65) Prior Publication Data

US 2022/0348016 A1 Nov. 3, 2022

(30) Foreign Application Priority Data

Apr. 30, 2021 (JP) ................................ 2021-077273

(51) Int. Cl.
*B41J 2/14* (2006.01)

(52) U.S. Cl.
CPC ....... *B41J 2/14233* (2013.01); *B41J 2/14145* (2013.01); *B41J 2002/14362* (2013.01); *B41J 2202/12* (2013.01)

(58) Field of Classification Search
CPC ............... B41J 2/14233; B41J 2/14145; B41J 2002/14362; B41J 2202/12; B41J 2/165; B41J 19/207; B41J 2002/14241; B41J 2002/14338; B41J 2002/14419; B41J 2002/14459; B41J 2002/14491; B41J 2202/11; B41J 2/16526
See application file for complete search history.

(56) References Cited

U.S. PATENT DOCUMENTS

2020/0070520 A1* 3/2020 Murakami ........... B41J 2/17563
2020/0198349 A1 6/2020 Uchida et al.

FOREIGN PATENT DOCUMENTS

JP 2021-024082 2/2021

* cited by examiner

*Primary Examiner* — Lisa Solomon
(74) *Attorney, Agent, or Firm* — WORKMAN NYDEGGER

(57) ABSTRACT

The control portion controls (i) a discharging operation of discharging the liquid from the plurality of nozzles by driving the plurality of energy generation elements and (ii) a pressurization operation of pressurizing the liquid from the individual flow path side in a state in which the plurality of nozzles are sealed by the sealing portion.

16 Claims, 20 Drawing Sheets

LIQUID DISCHARGING APPARATUS AND LIQUID DISCHARGING METHOD

The present application is based on, and claims priority from JP Application Serial Number 2021-077273, filed Apr. 30, 2021, the disclosure of which is hereby incorporated by reference herein in its entirety.

BACKGROUND

1. Technical Field

The present disclosure relates to a liquid discharging apparatus and a liquid discharging method.

2. Related Art

There is a liquid discharging apparatus having a liquid discharging head that discharges liquid such as ink. The liquid discharging head described in JP-A-2021-24082 includes a plurality of nozzles that discharge liquid, a plurality of individual flow paths provided for each of the plurality of nozzles, and a common liquid chamber that communicates in common with the plurality of individual flow paths.

In the liquid discharging head, the plurality of individual flow paths communicate with a common liquid chamber. The cross-sectional area of the individual flow path is narrower than the cross-sectional area of the common liquid chamber. Therefore, in a region where the cross-sectional area of the flow path is narrowed, particles present in the liquid may stay and the flow path may be clogged.

SUMMARY

According to one aspect of the present disclosure, there is provided a liquid discharging apparatus including a liquid discharging head discharging liquid from a plurality of nozzles, a sealing portion configured to seal the plurality of nozzles, and a control portion controlling an operation of the liquid discharging head. The liquid discharging head has a plurality of individual flow paths communicating with at least one of the plurality of nozzles and each having a pressure chamber, and a common supply flow path communicating in common with the plurality of individual flow paths and supplying the liquid to the plurality of individual flow paths. The control portion controls (i) a discharging operation of discharging the liquid from the plurality of nozzles by driving an energy generation element that causes a pressure of the liquid inside the pressure chamber to fluctuate and (ii) a pressurization operation of pressurizing the liquid from the individual flow path side in a state in which the plurality of nozzles are sealed by the sealing portion.

According to another aspect of the present disclosure, there is provided a liquid discharging method of discharging liquid from a plurality of nozzles of a liquid discharging head, in which the liquid discharging head has a plurality of individual flow paths each having a pressure chamber that communicates with at least one of the plurality of nozzles, and a common supply flow path that communicates in common with the plurality of individual flow paths and supplies the liquid to the plurality of individual flow paths, the liquid discharging method including (i) performing a discharging operation of discharging the liquid from the plurality of nozzles by driving an energy generation element that causes a pressure of the liquid inside the pressure chamber to fluctuate, and (ii) performing a pressurization operation of pressurizing the liquid from the individual flow path side in a state in which the plurality of nozzles are sealed.

DESCRIPTION OF EXEMPLARY EMBODIMENTS

Hereinafter, an embodiment of carrying out the present disclosure will be described with reference to the drawings. However, in each drawing, the size and scale of each part are appropriately different from the actual ones. Further, the embodiments described below are suitable specific examples of the present disclosure, so various technically preferable limitations are attached, but the scope of the present disclosure is not limited to these embodiments unless otherwise stated to limit the present disclosure in the following description.

In the following description, the three directions intersecting each other may be described as the X axis direction, the Y axis direction, and the Z axis direction. The X axis direction includes the X1 direction and the X2 direction which are opposite directions to each other. The Y axis direction includes the Y1 direction and the Y2 direction which are opposite directions to each other. The Z axis direction includes the Z1 direction and the Z2 direction which are opposite directions to each other. The Z1 direction is a downward direction, and the Z2 direction is an upward direction. Further, in the present specification, the terms "top" and "bottom" are used. The "top" and "bottom" correspond to "top" and "bottom" in a normal use state in which a nozzle of a liquid discharging apparatus 1 is positioned at the bottom.

The X axis direction, the Y axis direction, and the Z axis direction are orthogonal to each other. The Z axis direction is usually a direction along the vertical direction, but the Z axis direction does not have to be a direction along the vertical direction.

Figure 1:
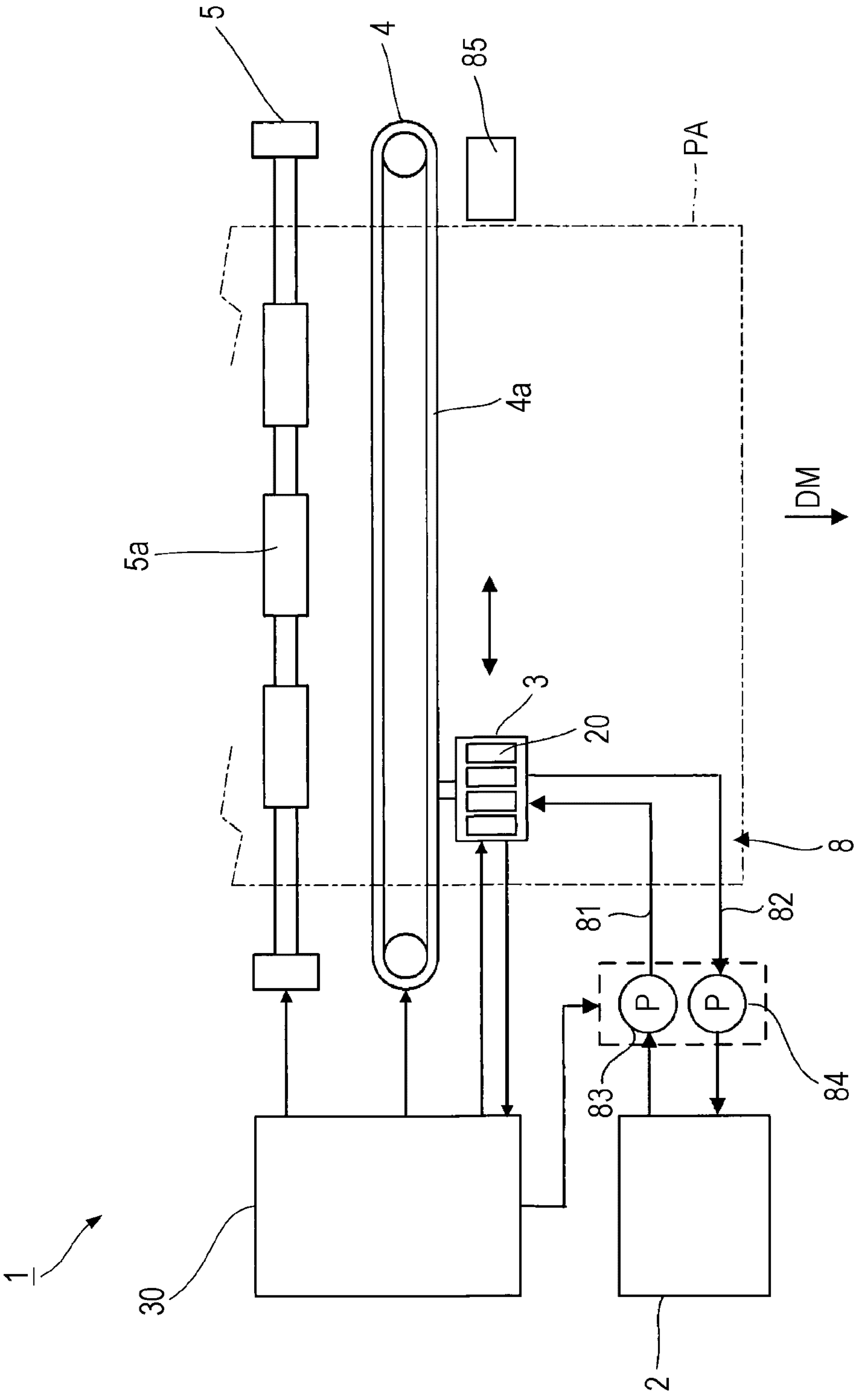
FIG. 1 is a schematic view illustrating a liquid discharging apparatus according to a first embodiment.
Figure 2:
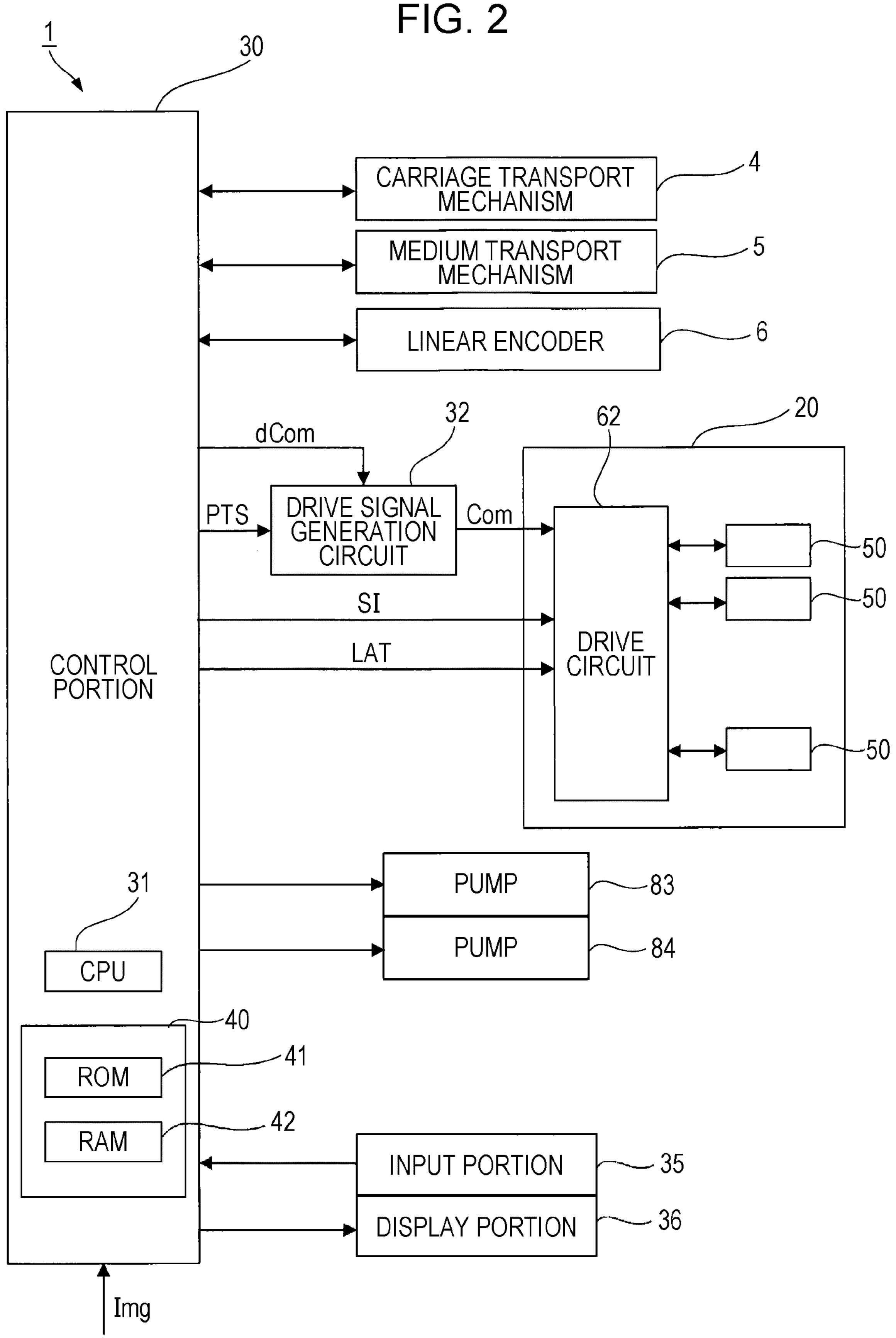
FIG. 2 is a block view illustrating the liquid discharging apparatus.

FIG. 1 is a schematic view illustrating the liquid discharging apparatus 1 according to a first embodiment. FIG. 2 is a block view illustrating the liquid discharging apparatus 1. The liquid discharging apparatus 1 is an ink jet type printing apparatus that ejects ink, which is an example of "liquid", as droplets onto a medium PA. The liquid discharging apparatus 1 is a serial type printing apparatus. The medium PA is typically printing paper. The medium PA is not limited to printing paper and may be a printing target of any material such as a resin film or cloth.

The liquid discharging apparatus 1 includes a liquid discharging head 20 that discharges ink, a liquid container 2 that stores the ink, a carriage 3 in which the liquid discharging head 20 is mounted, a carriage transport mechanism 4 for transporting the carriage 3, a medium transport mechanism 5 for transporting a medium PA, and a control portion 30.

As a specific aspect of the liquid container 2, for example, a cartridge that is attachable to and detachable from the liquid discharging apparatus 1, a bag-shaped ink pack made of a flexible film, and an ink tank that can be replenished with the ink are used. Any type of ink can be stored in the liquid container 2. The liquid discharging apparatus 1 includes, for example, a plurality of liquid containers 2 corresponding to four colors of ink. Examples of the four color ink include cyan, magenta, yellow, and black. The liquid container 2 may be mounted on the carriage 3.

The carriage transport mechanism 4 has a transport belt 4*a* and a motor for transporting the carriage 3. The medium transport mechanism 5 has a transporting roller 5*a* and a motor for transporting the medium PA. The carriage transport mechanism 4 and the medium transport mechanism 5 are controlled by the control portion 30. The liquid discharging apparatus 1 transports the carriage 3 by using the carriage transport mechanism 4 while transporting the medium PA by using the medium transport mechanism 5, and then discharges ink droplets to the medium PA for printing.

The liquid discharging apparatus 1 includes a linear encoder 6 as illustrated in FIG. 2. The linear encoder 6 is provided at a position where a position of the carriage 3 can be detected. The linear encoder 6 acquires information related to the position of the carriage 3. The linear encoder 6 outputs an encoder signal to the control portion 30 according to a movement of the carriage 3.

Figure 3:
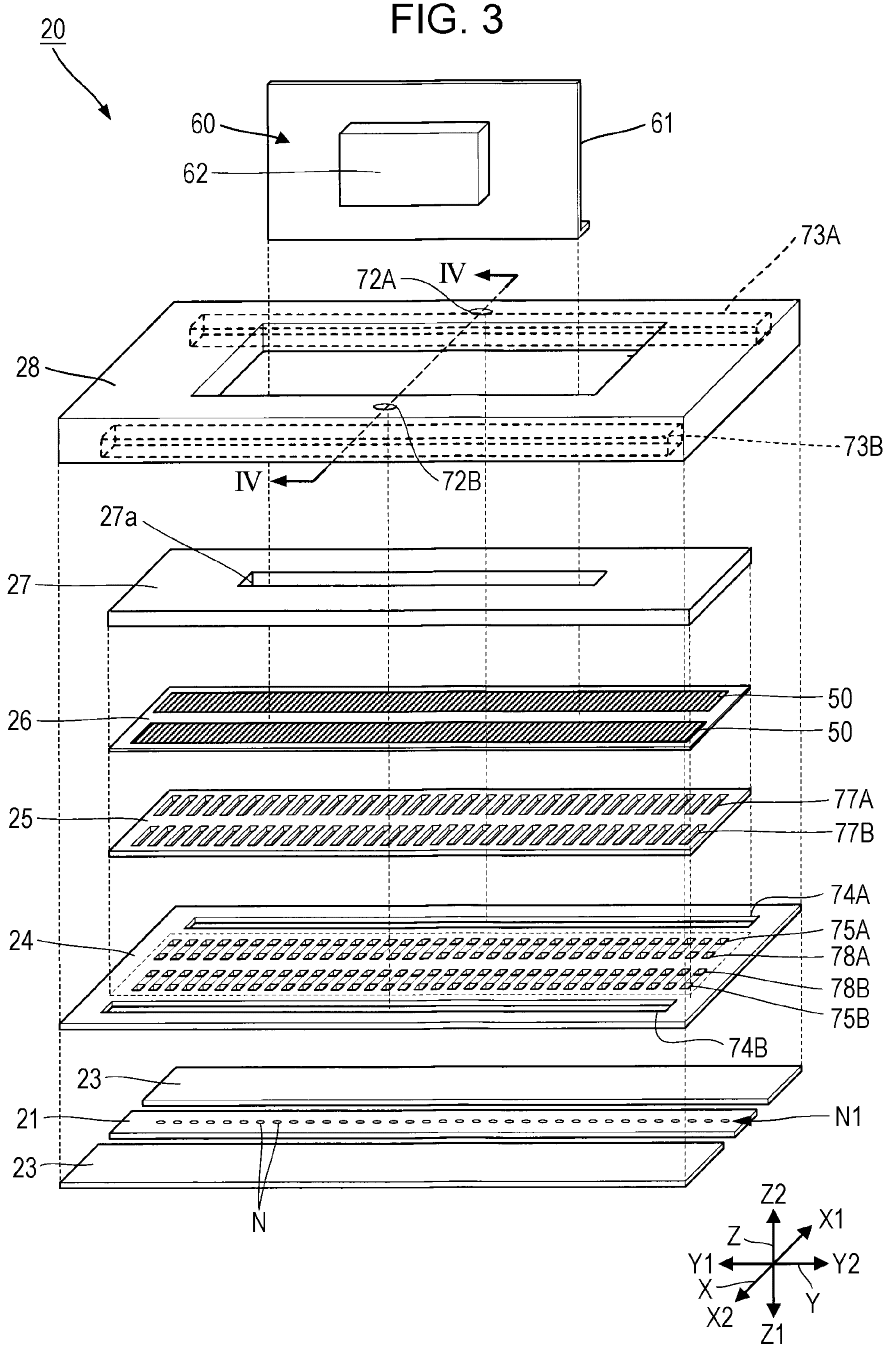
FIG. 3 is an exploded perspective view illustrating a liquid discharging head.
Figure 4:
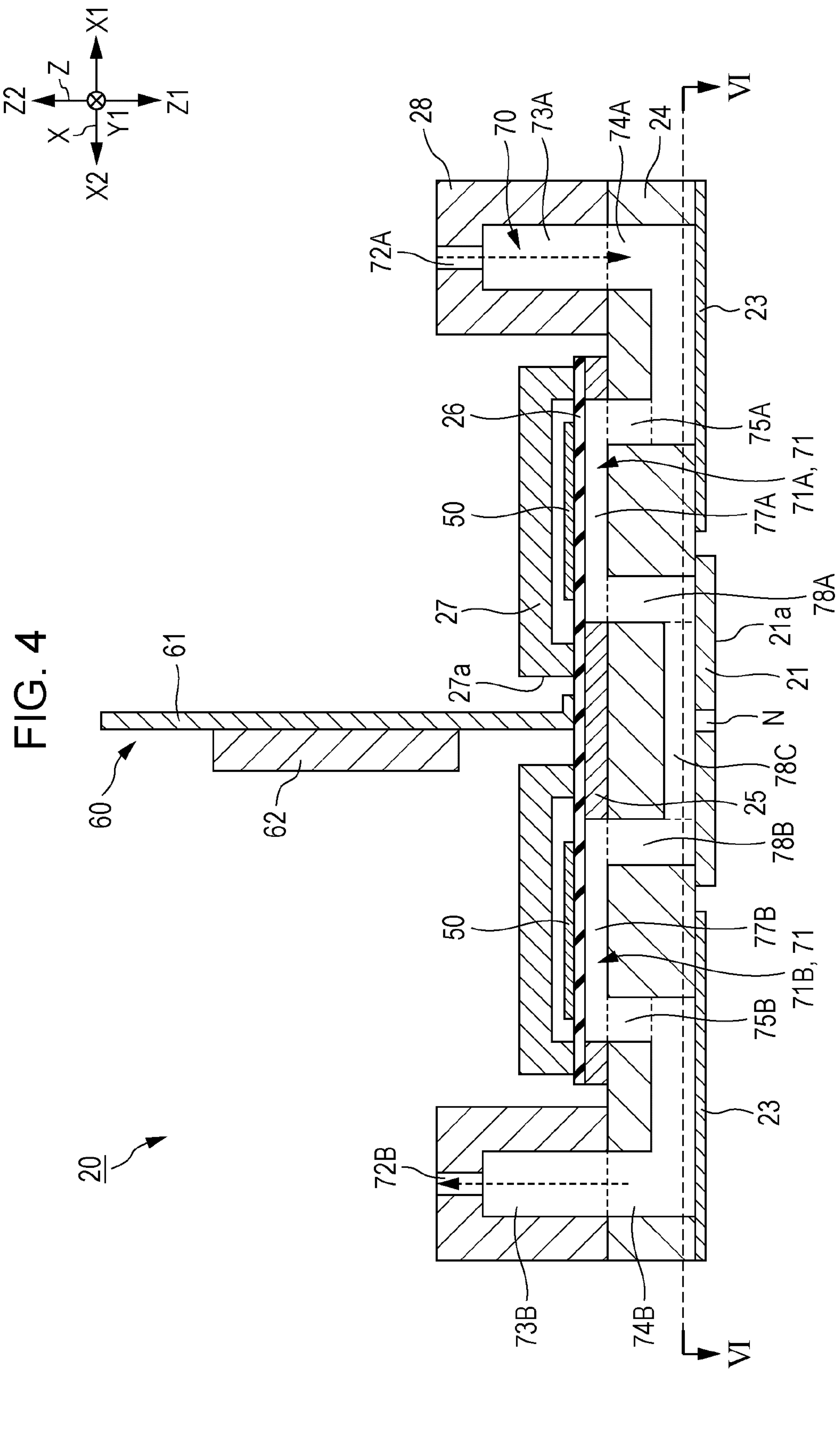
FIG. 4 is a cross-sectional view illustrating a cross section of the liquid discharging head.

Next, the liquid discharging head 20 will be described with reference to FIGS. 3 and 4. FIG. 3 is an exploded perspective view illustrating the liquid discharging head 20. FIG. 4 is a cross-sectional view illustrating the liquid discharging head 20. FIG. 4 illustrates a cross section taken along the line IV-IV illustrated in FIG. 3. The liquid discharging head 20 includes a nozzle plate 21, a compliance substrate 23, a communication plate 24, a pressure chamber formation plate 25, a vibrating plate 26, and a piezoelectric actuator 50. Further, the liquid discharging head 20 includes a protective substrate 27, a case 28, and a COF 60. The COF is an abbreviation for Chip on Film.

The thickness directions of the nozzle plate 21, the compliance substrate 23, the communication plate 24, the pressure chamber formation plate 25, the vibrating plate 26, the protective substrate 27, and the case 28 are along the Z axis direction. The nozzle plate 21 and the compliance substrate 23 are disposed at a bottom portion of the liquid discharging head 20. The communication plate 24 is disposed in the Z2 direction of the nozzle plate 21 and the compliance substrate 23. The pressure chamber formation plate 25 is disposed in the Z2 direction of the communication plate 24. The vibrating plate 26 is disposed in the Z2 direction of the pressure chamber formation plate 25. A plurality of piezoelectric actuators 50 are formed on the vibrating plate 26. The protective substrate 27 is disposed in the Z2 direction of the vibrating plate 26. The protective substrate 27 covers the plurality of piezoelectric actuators 50. The case 28 is disposed on the communication plate 24.

As illustrated in FIG. 4, the liquid discharging head 20 is formed with a flow path 70 through which the ink flows. The flow path 70 includes a supply port 72A, an exhaust port 72B, common liquid chambers 73A, 73B, 74A, and 74B, relay flow paths 75A and 75B, pressure chambers 77A and 77B, communication flow paths 78A, 78B, and 78C, and a nozzle N. The flow path 70 includes a plurality of individual flow paths 71. The individual flow path 71 has an individual flow path 71A on a supply side and an individual flow path 71B on an exhaust side. The individual flow path 71A on the supply side may include the relay flow path 75A, the pressure chamber 77A, the communication flow path 78A, and a part of the communication flow path 78C. The individual flow path 71B on the exhaust side may include a part of the communication flow path 78C, the communication flow path 78B, the pressure chamber 77B, and the relay flow path 75B. The common liquid chambers 73A and 74A are examples of a common supply flow path that communicates in common with the plurality of individual flow paths 71 and supplies the liquid to the plurality of individual flow paths 71. The common liquid chambers 73B and 74B are examples of a common exhaust flow path that communicates in common with the plurality of individual flow paths 71 and exhausts the liquid flowing in from the plurality of individual flow paths 71.

The ink passes through the supply port 72A and flows into the common liquid chamber 73A. The common liquid chambers 73A and 74A form a common liquid chamber that communicates with each other. The ink inside the common liquid chambers 73A and 74A passes through the relay flow path 75A and is supplied to the pressure chamber 77A. The ink inside the pressure chamber 77A passes through the communication flow paths 78A and 78C and is discharged from the nozzle N.

Of the ink inside the communication flow path 78C, the ink that is not discharged from the nozzle N passes through the communication flow path 78B and flows into the pressure chamber 77B. The ink inside the pressure chamber 77B passes through the relay flow path 75B and is exhausted to the common liquid chamber 74B. The common liquid chambers 73B and 74B form a common liquid chamber that communicates with each other. The ink inside the common liquid chamber 73B passes through the exhaust port 72B and is exhausted to the outside of the liquid discharging head 20. The flow of the ink outside the liquid discharging head 20 will be described later.

Figure 5:
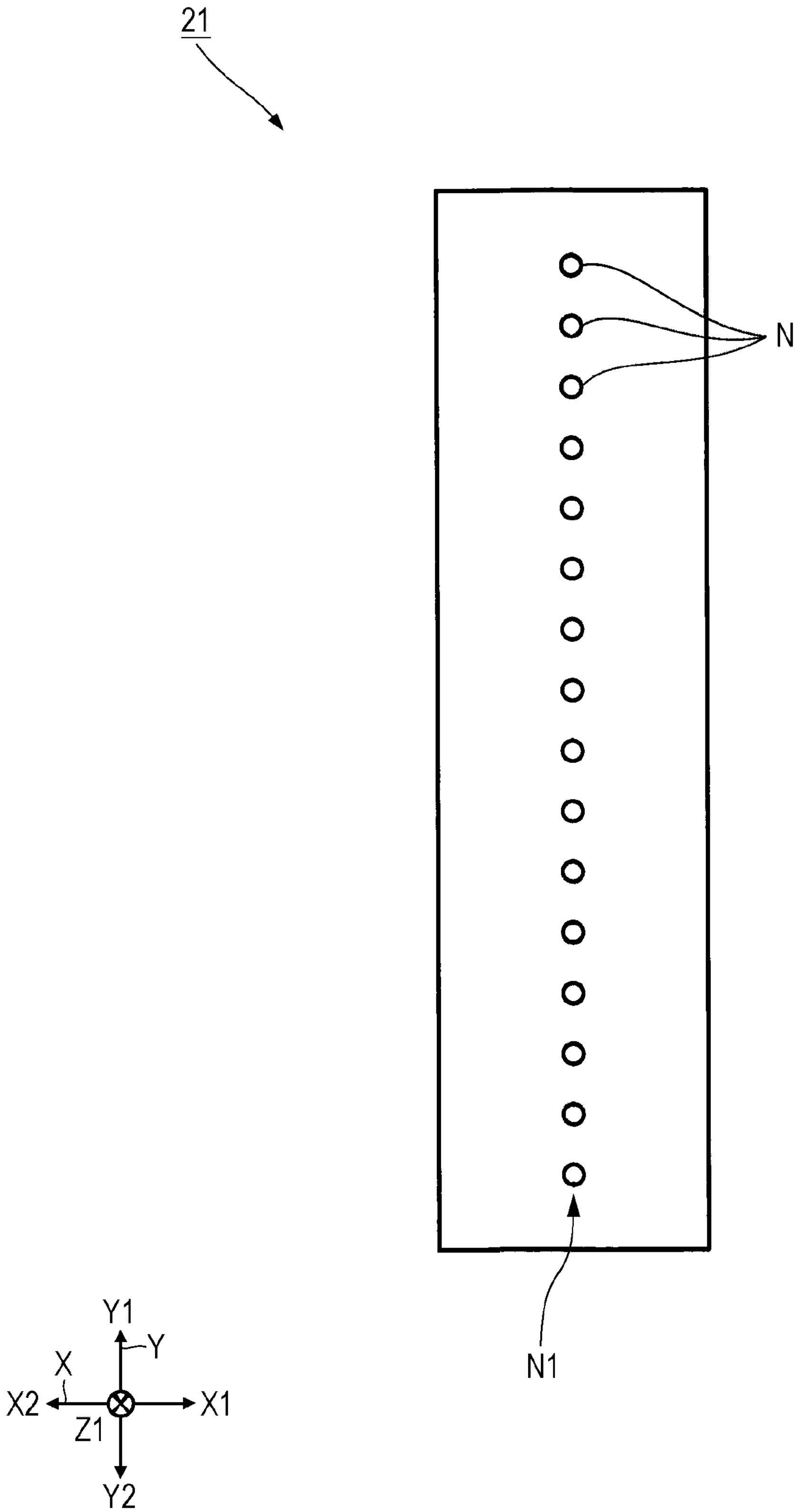
FIG. 5 is a plan view illustrating a nozzle plate.

FIG. 5 is a plan view illustrating the nozzle plate 21. The nozzle plate 21 has a rectangular shape when viewed in the Z axis direction. A plurality of nozzles N are formed on the nozzle plate 21. The plurality of nozzles N are arranged in the Y axis direction to form a nozzle row N1. The nozzle N is a through hole that penetrates the nozzle plate 21 in the Z axis direction.

As illustrated in FIGS. 3 and 4, a compliance substrate 23 is disposed on both sides of the nozzle plate 21 in the X axis direction. The compliance substrate 23 includes a film having flexibility. The compliance substrate 23 forms the bottom surface of the common liquid chambers 74A and 74B. The compliance substrate 23 is deformable under the pressure of the ink. The compliance substrate 23 is deformed by the pressure of the ink and can absorb the pressure fluctuation of the ink inside the liquid discharging head 20.

Figure 6:
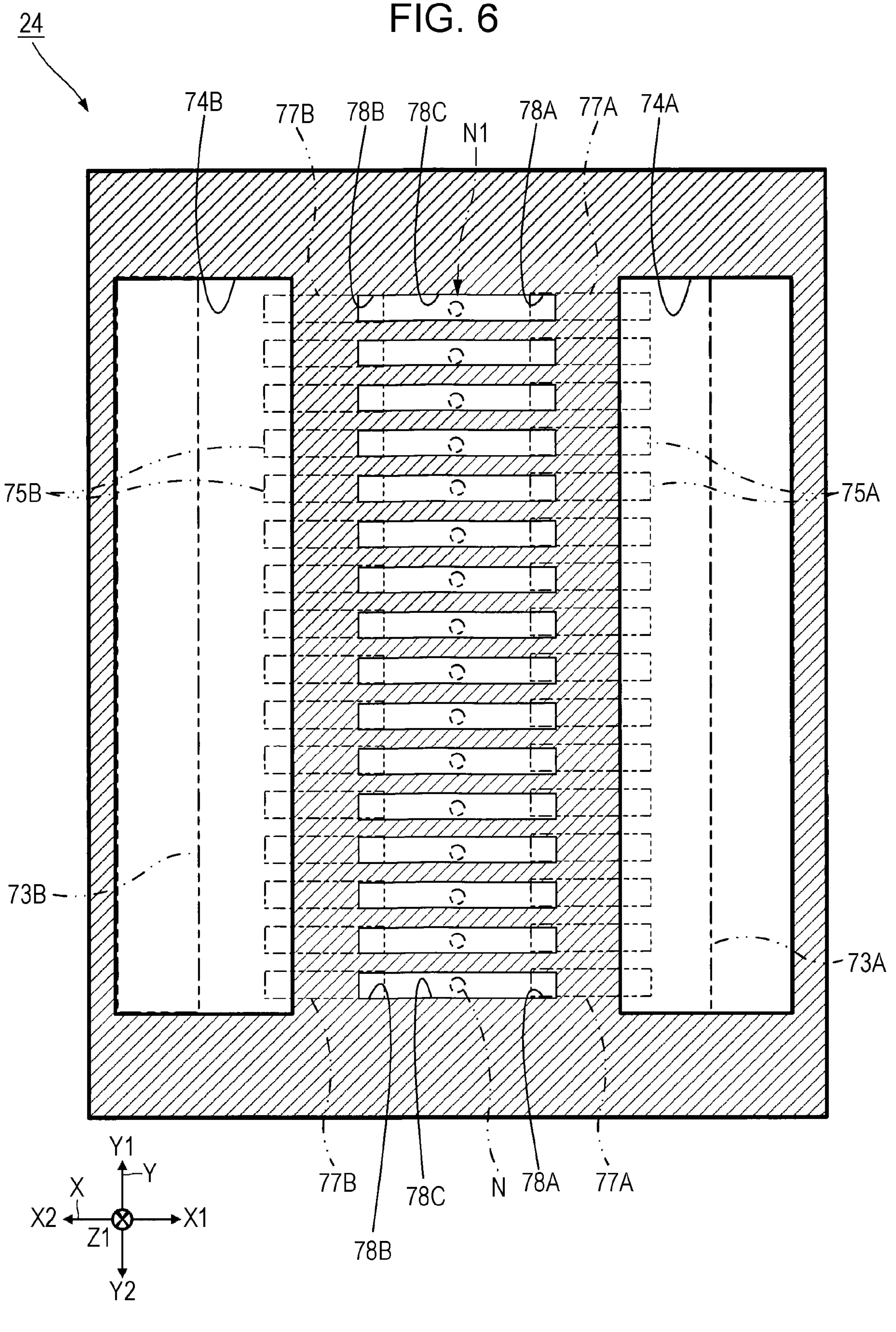
FIG. 6 is a cross-sectional view illustrating a communication plate and is a view illustrating a cross section taken along the line VI-VI in FIG. 4.

FIG. 6 is a cross-sectional view illustrating the communication plate 24. As illustrated in FIGS. 3, 4, and 6, the communication plate 24 is formed with common liquid chambers 74A and 74B, relay flow paths 75A and 75B, and communication flow paths 78A, 78B, and 78C. In FIG. 6, positions of the common liquid chambers 73A and 73B, the pressure chambers 77A and 77B, and the nozzle N are illustrated with virtual lines.

The common liquid chambers 74A and 74B are long in the Y axis direction. The lengths of the common liquid chambers 74A and 74B in the Y axis direction correspond to the arrangement of the plurality of nozzles N. A part of the common liquid chamber 74A in the X1 direction is disposed so as to overlap the common liquid chamber 73A when viewed in the Z axis direction. A part of the common liquid chamber 74A in the X1 direction penetrates in the Z axis direction. A part of the common liquid chamber 74A closer to the nozzle N is formed up to a position overlapping the pressure chamber 77A when viewed in the Z axis direction. Similarly, a part of the common liquid chamber 74B in the X2 direction is disposed so as to overlap the common liquid chamber 73B when viewed in the Z axis direction. A part of the common liquid chamber 74B in the X2 direction penetrates in the Z axis direction. A part of the common liquid chamber 74B closer to the nozzle N is formed up to a position overlapping the pressure chamber 77B when viewed in the Z axis direction.

The relay flow path 75A makes the pressure chamber 77A and the common liquid chamber 74A communicate with each other. The relay flow path 75A is provided for each of the plurality of pressure chambers 77A. The plurality of relay flow paths 75A are arranged at predetermined intervals in the Y axis direction. The relay flow path 75B makes the pressure chamber 77B and the common liquid chamber 74B communicate with each other. The relay flow path 75B is provided for each of the plurality of pressure chambers 77B. The plurality of relay flow paths 75B are arranged at predetermined intervals in the Y axis direction.

The communication flow paths 78A, 78B, and 78C extend in the X axis direction and makes the pressure chamber 77A and the pressure chamber 77B communicate with each other. The communication flow paths 78A, 78B, and 78C are provided for each of the plurality of pressure chambers 77A and 77B. The plurality of communication flow paths 78A, 78B, and 78C are disposed at predetermined intervals in the Y axis direction.

The communication flow paths 78A and 78B penetrate the communication plate 24 in the Z axis direction. The communication flow paths 78A and 78B are separated from each other in the X axis direction. The communication flow path 78A is disposed at a position overlapping the pressure chamber 77A when viewed in the Z axis direction. The communication flow path 78B is disposed at a position overlapping the pressure chamber 77B when viewed in the Z axis direction. The communication flow path 78C extends in the X axis direction and makes the communication flow path 78A and the communication flow path 78B communicate with each other. The nozzle N communicates with each of the plurality of communication flow paths 78C.

Figure 7:
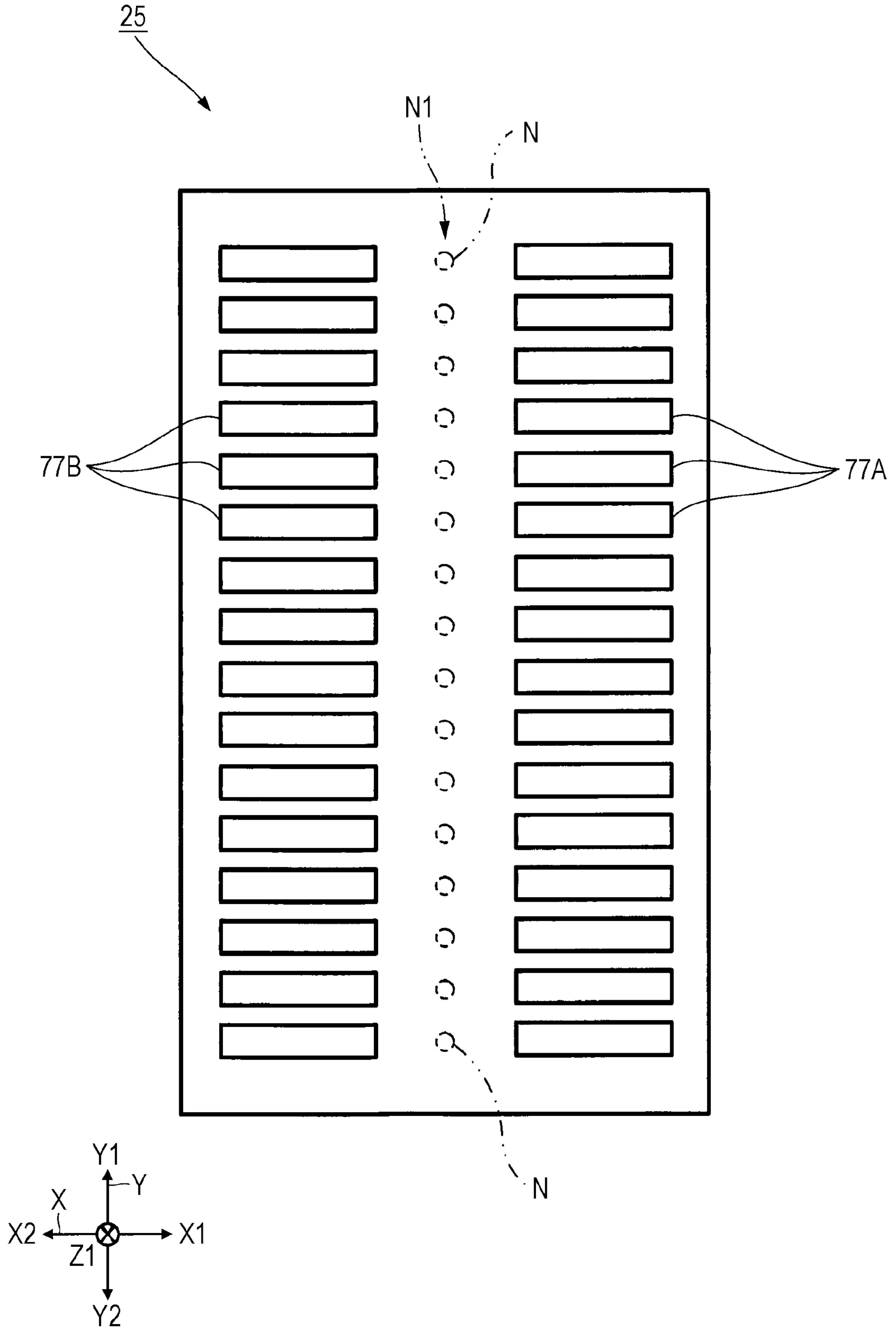
FIG. 7 is a plan view illustrating a pressure chamber formation plate.

FIG. 7 is a plan view illustrating the pressure chamber formation plate 25. In FIG. 7, the position corresponding to the nozzle N is illustrated with a virtual line. As illustrated in FIGS. 3, 4, and 7, the plurality of pressure chambers 77A and 77B are formed in the pressure chamber formation plate 25. The pressure chambers 77A and 77B penetrate the pressure chamber formation plate 25 in the Z axis direction. The pressure chambers 77A and 77B are separated from each other in the X axis direction. The plurality of pressure chambers 77A and 77B are provided for each of the plurality of nozzles N. The plurality of pressure chambers 77A are disposed at predetermined intervals in the Y axis direction. The plurality of pressure chambers 77B are disposed at predetermined intervals in the Y axis direction. The pressure chamber 77A communicates with the relay flow path 75A and the communication flow path 78A. The pressure chamber 77B communicates with the relay flow path 75B and the communication flow path 78B. The pressure chamber formation plate 25 can be manufactured from, for example, a silicon single crystal substrate. The pressure chamber formation plate 25 may be manufactured from other materials.

As illustrated in FIGS. 3 and 4, the vibrating plate 26 is disposed on the upper surface of the pressure chamber formation plate 25. The vibrating plate 26 covers an opening of the pressure chamber formation plate 25. A part of the vibrating plate 26 that covers the opening of the pressure chamber formation plate 25 forms the upper side wall surface of the pressure chambers 77A and 77B. A plurality of piezoelectric actuators 50 are formed on the vibrating plate 26. The piezoelectric actuator 50 is provided for each of the plurality of pressure chambers 77A and 77B.

Figure 8:
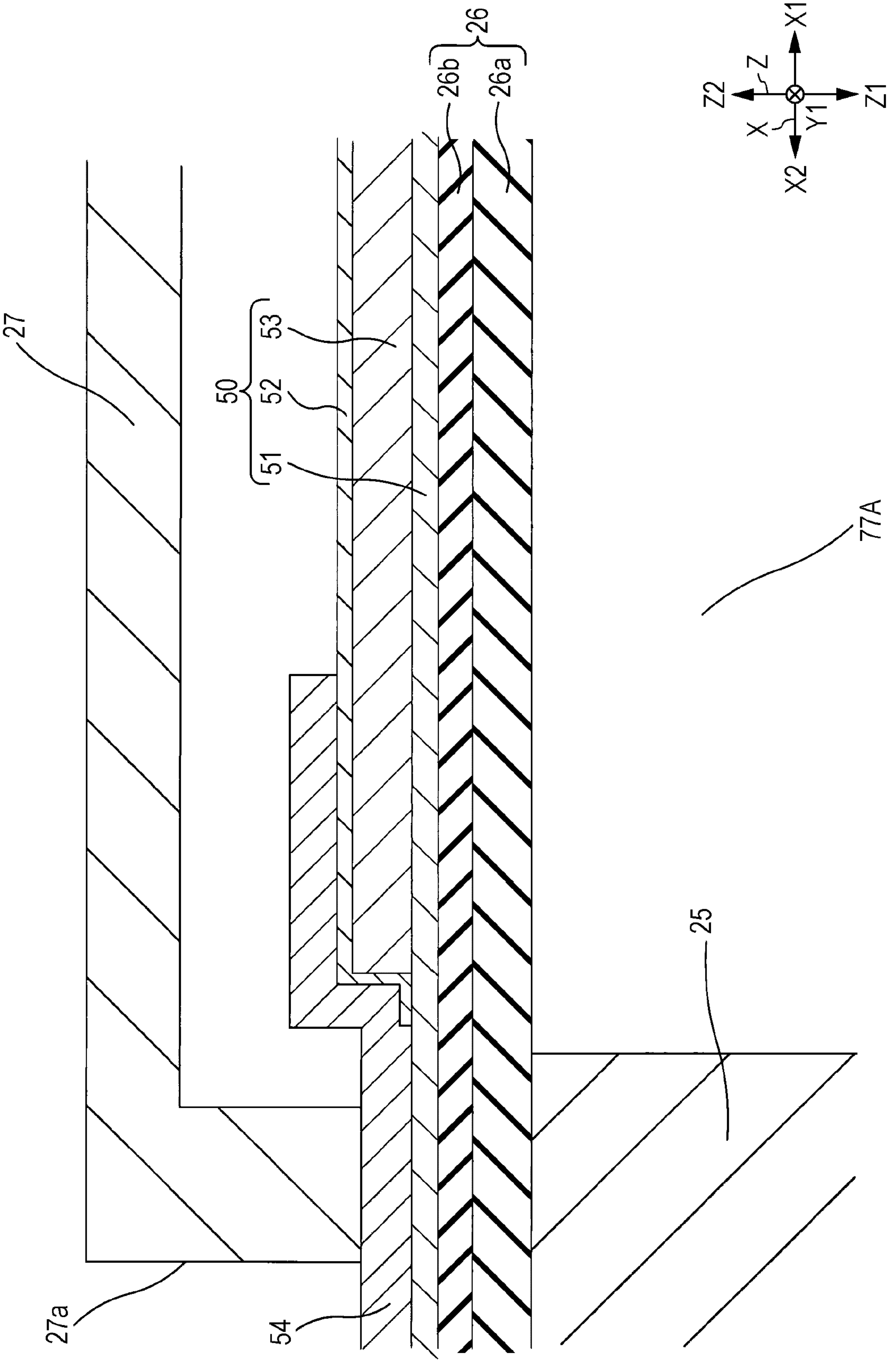
FIG. 8 is an enlarged cross-sectional view illustrating a main portion of a vibrating plate and a piezoelectric actuator.

FIG. 8 is a cross-sectional view illustrating the vibrating plate 26 and the piezoelectric actuator 50. As illustrated in FIG. 8, the vibrating plate 26 is formed with a plurality of insulating layers 26*a* and 26*b*. The vibrating plate 26 includes the insulating layer 26*a* made of silicon dioxide ($SiO_2$) and the insulating layer 26*b* made of zirconium dioxide ($ZrO_2$). The insulating layer 26*a* is formed on the pressure chamber formation plate 25, and the insulating layer 26*b* is formed on the insulating layer 26*a*.

The vibrating plate 26 is driven by the piezoelectric actuator 50 and vibrates in the Z axis direction. The total thickness of the vibrating plate 26 is, for example, 2 μm or less. The total thickness of the vibrating plate 26 may be 15

μm or less, 40 μm or less, or 100 μm or less. For example, when the total thickness of the vibrating plate 26 is 15 μm or less, a resin layer may be included. The vibrating plate 26 may be made of metal. Examples of the metal include stainless steel and nickel. When the vibrating plate 26 is made of metal, the thickness of the vibrating plate 26 may be 15 μm or more or 100 μm or less.

The piezoelectric actuator 50 has electrodes 51 and 52, and a piezoelectric body layer 53. The electrode 51, the piezoelectric body layer 53, and the electrode 52 are laminated in this order on the vibrating plate 26. A piezoelectric body layer 53 is interposed between the electrode 51 and the electrode 52. The electrode 51 is an individual electrode, and the electrode 52 is a common electrode. The electrode 51 may be a common electrode, and the electrode 52 may be an individual electrode. Each of the electrodes 51 is disposed at a position overlapping the plurality of pressure chambers 77A and 77B when viewed in the Z axis direction.

The electrode 51 includes a base layer and an electrode layer. The base layer includes, for example, titanium (Ti). The electrode layer includes a low resistance conductive material such as platinum (Pt) or iridium (Ir). The electrode layer may be formed of an oxide such as strontium ruthenate ($SrRuO_3$) and lanthanum nickelate ($LaNiO_3$). The piezoelectric body layer 53 is disposed so as to cover the plurality of electrodes 51. The piezoelectric body layer 53 is a strip-shaped dielectric film extending in the Y axis direction.

The electrode 52 includes a base layer and an electrode layer. The base layer includes, for example, titanium. The electrode layer includes a low resistance conductive material such as platinum or iridium. The electrode layer may be formed of an oxide such as strontium ruthenate and lanthanum nickelate. Of the piezoelectric body layer 53, a region between the electrodes 51 and 52 is a drive region. The drive regions are respectively formed on each of the plurality of pressure chambers 77A and 77B.

A lead electrode 54 is electrically coupled to the piezoelectric actuator 50. The plurality of lead electrodes 54 extend in the X axis direction and are drawn out into the opening portion 27*a* of the protective substrate 27. The lead electrode 54 is not illustrated in FIGS. 3 and 4. The opening portion 27*a* penetrates the protective substrate 27 in the Z axis direction. When viewed in the Z axis direction, it is electrically coupled to the COF 60 at a position corresponding to the opening portion 27*a*. The lead electrode 54 is made of a conductive material having a lower resistance than the electrode 51. For example, the lead electrode 54 is a conductive pattern having a structure in which a gold (Au) conductive film is laminated on the surface of a conductive film made of nichrome (NiCr).

The protective substrate 27 has a rectangular shape when viewed in the Z axis direction. The protective substrate 27 protects the plurality of piezoelectric actuators 50 and reinforces the mechanical intensity of the pressure chamber formation plate 25 and the vibrating plate 26. The protective substrate 27 is adhered to the vibrating plate 26 with, for example, an adhesive agent.

The COF 60 includes a flexible wiring substrate 61 and a drive circuit 62. The flexible wiring substrate 61 is a wiring substrate having flexibility. The flexible wiring substrate 61 is, for example, an FPC. The flexible wiring substrate 61 may be, for example, an FFC. FPC is an abbreviation for Flexible Printed Circuit. FFC is an abbreviation for Flexible Flat Cable.

The flexible wiring substrate 61 is coupled to the piezoelectric actuator 50 via the lead electrode 54. The flexible wiring substrate 61 is electrically coupled to a circuit substrate (not illustrated). The circuit substrate includes a drive signal generation circuit 32 illustrated in FIG. 2.

The drive circuit 62 is mounted on the flexible wiring substrate 61. The drive circuit 62 includes a switching element for driving the piezoelectric actuator 50. The drive circuit 62 is electrically coupled to the control portion 30 via the flexible wiring substrate 61 and the circuit substrate. The drive circuit 62 receives a drive signal Com output from the drive signal generation circuit 32. The switching element of the drive circuit 62 switches whether or not to supply the drive signal Com generated by the drive signal generation circuit 32 to the piezoelectric actuator 50. The drive circuit 62 supplies a drive voltage or current to the piezoelectric actuator 50 to vibrate the vibrating plate 26.

Figure 9:
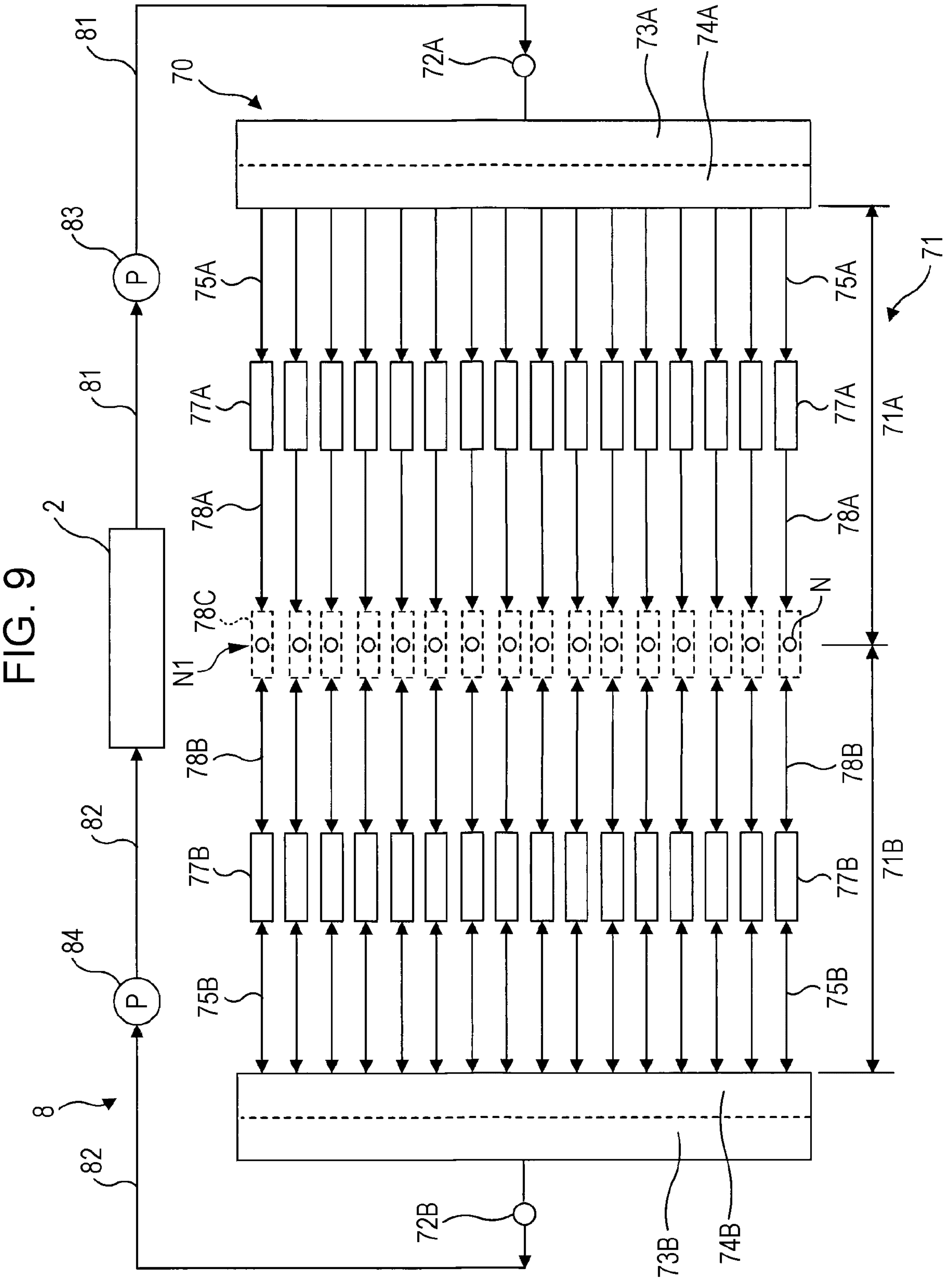
FIG. 9 is a schematic view illustrating a flow path of ink in the liquid discharging apparatus.

FIG. 9 is a schematic view illustrating the flow path of the ink. As illustrated in FIGS. 1 and 9, the liquid discharging apparatus 1 includes a circulation mechanism 8 for circulating the ink. The circulation mechanism 8 has a supply flow path 81 for supplying the ink to the liquid discharging head 20 and a collection flow path 82 for collecting the ink exhausted from the liquid discharging head 20. The circulation mechanism 8 includes a pump 83 coupled to the supply flow path 81 and a pump 84 coupled to the collection flow path 82. The pumps 83 and 84 are controlled by the control portion 30. The pump 83 supplies the ink to the liquid discharging head 20 from the supply flow path 81. The pump 84 can supply the ink from the collection flow path 82 to the liquid discharging head 20. The liquid discharging apparatus 1 can drive the pump 84 to allow the ink to flow reversely, for example, when the maintenance is performed. Details will be described later.

The control portion 30 illustrated in FIG. 2 includes one or more CPUs 31. The control portion 30 may include an FPGA instead of the CPU 31 or in addition to the CPU 31. The control portion 30 includes a storage portion 40. The storage portion 40 includes, for example, a ROM 41 and a RAM 42. The storage portion 40 may include an EEPROM or a PROM. The storage portion 40 can store print data Img supplied from a host computer. The storage portion 40 stores a control program of the liquid discharging apparatus 1.

CPU is an abbreviation for Central Processing Unit. FPGA is an abbreviation for Field-Programmable Gate Array. RAM is an abbreviation for Random Access Memory. ROM is an abbreviation for Read Only Memory. EEPROM is an abbreviation for Electrically Erasable Programmable Read-Only Memory. PROM is an abbreviation for Programmable ROM.

The control portion 30 generates a signal for controlling the operation of each portion of the liquid discharging apparatus 1. The control portion 30 can generate a print signal SI and a waveform designation signal dCom. The print signal SI is a digital signal for designating the type of operation of the liquid discharging head 20. The print signal SI can designate whether or not to supply the drive signal Com to the piezoelectric actuator 50. The waveform designation signal dCom is a digital signal that defines a waveform of the drive signal Com. The drive signal Com is an analog signal for driving the piezoelectric actuator 50.

As described above, the liquid discharging apparatus 1 includes the drive signal generation circuit 32. The drive signal generation circuit 32 is electrically coupled to the control portion 30. The drive signal generation circuit 32 includes a DA conversion circuit. The drive signal generation circuit 32 generates a drive signal Com having a waveform defined by the waveform designation signal dCom. When the control portion 30 receives an encoder signal from a linear encoder 6, the control portion 30 outputs a timing signal PTS to the drive signal generation circuit 32. The timing signal PTS defines a generation timing of the drive signal Com. The drive signal generation circuit 32 outputs the drive signal Com each time the timing signal PTS is received.

The drive circuit 62 is electrically coupled to the control portion 30 and the drive signal generation circuit 32. The drive circuit 62 switches whether or not to supply the drive signal Com to the piezoelectric actuator 50 based on the print signal SI. The drive circuit 62 can select the piezoelectric actuator 50 to which the drive signal Com is supplied based on the print signal SI, the latch signal LAT, and the change signal CH supplied from the control portion 30. The latch signal LAT defines a latch timing of the print data Img. The change signal CH defines a selection timing of the drive pulse included in the drive signal Com.

The control portion 30 controls a discharging operation of the ink by the liquid discharging head 20. As described above, the control portion 30 drives the piezoelectric actuator 50 to cause the pressure of the ink inside the pressure chambers 77A and 77B to fluctuate and discharge the ink from the nozzle N. The control portion 30 controls the discharging operation when the printing operation is performed. The control portion 30 may control the discharging operation when a maintenance operation is performed. As the maintenance operation, the control portion 30 can discharge the ink from the nozzle N before the printing or after the printing so as to reduce thickening of the ink inside the liquid discharging head 20.

Figure 10:
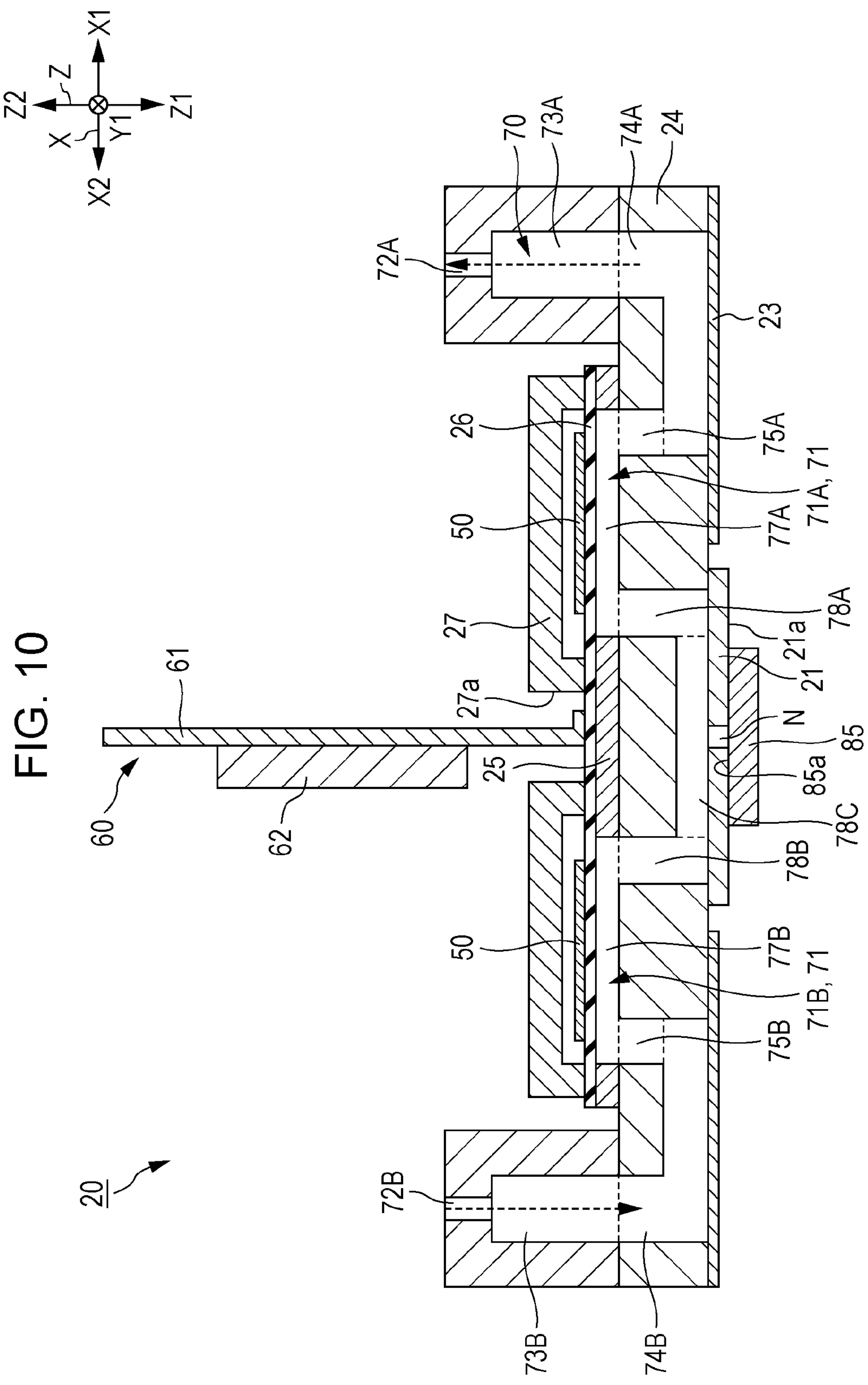
FIG. 10 is a cross-sectional view illustrating the liquid discharging head in a state in which a nozzle is sealed by a sealing portion.

The liquid discharging apparatus 1 can control a pressurization operation of pressurizing the liquid from the pressure chamber 77A toward the common liquid chamber 74A in a state in which the nozzle N is sealed. The liquid discharging apparatus 1 can control the pressurization operation of pressurizing the liquid inside the common liquid chamber 74A from the individual flow path side. FIG. 10 is a cross-sectional view illustrating the liquid discharging head 20 and is a view illustrating a state in which the nozzle N is sealed by the sealing portion 85. As illustrated in FIGS. 1 and 10, the liquid discharging apparatus 1 includes the sealing portion 85. The sealing portion 85 is in contact with the nozzle surface 21*a* of the nozzle plate 21, and the nozzle N is sealed. The nozzle surface 21*a* is the bottom surface of the nozzle plate 21. An opening of the nozzle N is formed on the nozzle surface 21*a*.

The sealing portion 85 has a surface 85*a* that can be in contact with the nozzle surface 21*a* of the nozzle plate 21. The sealing portion 85 is disposed so as to cover the nozzle N from below. The nozzle N is covered by the surface 85*a* of the sealing portion 85. The sealing portion 85 may have a plate shape, for example. The sealing portion 85 may be a block body. The sealing portion 85 may be provided with a projection portion to be inserted into the nozzle N. The sealing portion 85 may block the nozzle N and reduce the discharging of the ink from the nozzle N.

As illustrated in FIG. 1, the sealing portion 85 is disposed, for example, at the end of the transport path of the carriage 3. The carriage 3 reciprocates in the Y axis direction. When the carriage 3 is transported and disposed on the sealing portion 85, the surface 85*a* of the sealing portion 85 and the nozzle surface 21*a* of the nozzle plate 21 are in contact with each other. As a result, the nozzle N is in a state of being sealed by the sealing portion 85. The control portion 30 transmits a command signal to the carriage transport mechanism 4 to control the transport of the carriage 3.

The control portion 30 can control the pressurization operation so as to allow the ink inside the liquid discharging head 20 to flow reversely in a state in which the plurality of nozzles N are sealed by the sealing portion 85. The control portion 30 drives the pump 84 to control the pressurization operation.

Next, the flow of the ink during the reverse flow will be described with reference to FIGS. 9 and 10. The case where the ink flows from the common liquid chambers 73A and 74A toward the pressure chamber 77A through the relay flow path 75A is defined as a normal flow. The reverse flow is a flow in an opposite direction to the normal flow. In the reverse flow, the ink flows from the pressure chamber 77A toward the common liquid chamber 74A through the relay flow path 75A. The control portion 30 drives the pump 84 to allow the ink to flow reversely. By driving the pump 84, the ink inside the collection flow path 82 passes through the exhaust port 72B and flows into the common liquid chambers 73B and 74B. The ink inside the common liquid chambers 73B and 74B passes through the relay flow path 75B and flows into the pressure chamber 77B. The ink inside the pressure chamber 77B passes through the communication flow path 78B and flows into the communication flow path 78C.

The ink inside the communication flow path 78C passes through the communication flow path 78A and flows into the pressure chamber 77A. Since the nozzle N is sealed by the sealing portion 85, the ink inside the communication flow path 78C is not discharged from the nozzle N. The ink inside the pressure chamber 77A passes through the relay flow path 75A and flows into the common liquid chambers 73A and 74A. The ink inside the common liquid chambers 73A and 74A passes through the supply port 72A and is exhausted to the outside of the liquid discharging head 20. The ink that is exhausted from the supply port 72A passes through the supply flow path 81 and flows into the liquid container 2. In this way, the control portion 30 can control the pressurization operation to allow the ink to flow reversely. By reversing the flow of the ink, a flow is formed from the pressure chamber 77A toward the common liquid chambers 73A and 74A through the relay flow path 75A. The control portion 30 can control the pressurization operation of pressurizing the liquid from the individual flow path side in a state in which the plurality of nozzles N are sealed.

Figure 11:
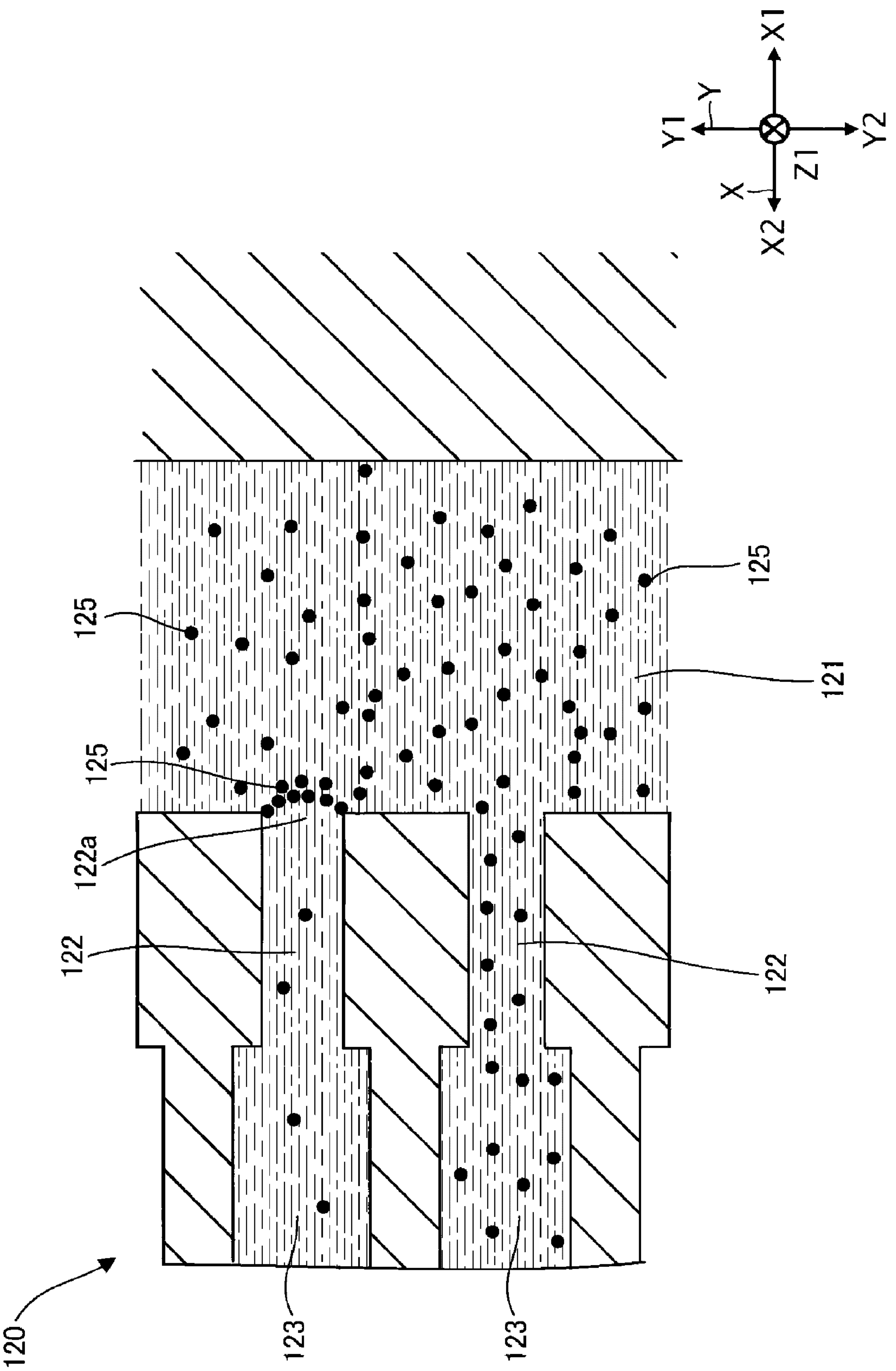
FIG. 11 is a cross-sectional view illustrating the liquid discharging head according to the related art and is a view illustrating a state in which particles are accumulated at a boundary between a relay flow path and a common liquid chamber.

Next, with reference to FIG. 11, the clogging caused by the particles 125 in the liquid discharging head 120 according to the related art will be described. As illustrated in FIG. 11, the liquid discharging head 120 includes the common liquid chamber 121, the plurality of relay flow paths 122, and the plurality of pressure chambers 123. The ink inside the common liquid chamber 121 passes through the plurality of relay flow paths 122 and is distributed to each of the plurality of pressure chambers 123.

The cross section of the relay flow path 122 is narrower than the cross section of the common liquid chamber 121. The "cross section" here is a cross section orthogonal to the flow direction of the liquid. In the related art, particles in the liquid may be clogged at the inlet 122*a* of the relay flow path 122. The inlet 122*a* is positioned at the boundary between the relay flow path 122 and the common liquid chamber 121. As illustrated in FIG. 11, in the related art, particles may stay at the inlet 122*a* and the flow path may be clogged. The particles 125 may be accumulated so as to rise toward the inside of the common liquid chamber 121, for example. For example, in a case where the particles are clogged at the inlet 122*a*, even when the pump 83 is used to pressurize the liquid from the common liquid chamber 121, the clogging caused by the particles may not be eliminated and the particles 125 may be further adhered to each other. Similarly, even when a suction pump is coupled to the nozzle N and the ink is sucked from the nozzle N, the clogging caused by the particles is not eliminated at the inlet 122*a*, and the particles 125 may further adhere to each other. In a case where the liquid is pressurized from the common liquid chamber 121 toward the pressure chamber 123 through the relay flow path 122 when the particles are clogged, only the liquid flows through the gap between the particles 125. Due to this flow, the adhesion between the particles 125 becomes stronger, and there is a possibility that the clogging caused by the particles 125 cannot be eliminated.

According to the liquid discharging apparatus 1 of the present embodiment, the ink can be pressurized from the pressure chamber 77A toward the common liquid chamber 74A in the state in which the plurality of nozzles N are sealed by the sealing portion 85. According to the liquid discharging apparatus 1, the ink can be pressurized in the direction opposite to the flow of the ink during the normal discharging operation. By controlling the pressurization operation by the control portion 30, the ink can be pressurized in the direction from the pressure chamber 77A toward the common liquid chamber 74A in the direction opposite to the normal ink flow. In the liquid discharging apparatus 1, the ink can be pressurized from the relay flow path 75A toward the common liquid chamber 74A. Therefore, it is possible to avoid the clogging between the relay flow path 75A and the common liquid chamber 74A. For example, when particles are accumulated between the relay flow path 75A and the common liquid chamber 74A, the particles can be pushed into the common liquid chamber 74A by pressurizing the ink from the pressure chamber 77A. As a result, the clogging between the relay flow path 75A and the common liquid chamber 74A can be reduced. According to the liquid discharging apparatus 1, when the particles are clogged, the force can be applied to the particles in the opposite direction to the case where the particles are clogged, so that the clogging caused by the particles can be eliminated. In the liquid discharging apparatus 1, the clogging caused by particles can be eliminated, and the ink discharging operation can be suitably performed.

In the liquid discharging apparatus 1, for example, the pressurization operation may be performed periodically to allow the ink to flow reversely from the pressure chamber 77A toward the common liquid chamber 74A. As a result, the particles adhering to the inner wall surface of the relay flow path 75A can be moved into the common liquid chamber 74. As a result, the clogging caused by particles can be reduced.

In the related art, there are restrictions on the particle diameter of the particles included in the liquid in order to prevent the clogging caused by the particles. However, in the liquid discharging apparatus 1, since the clogging caused by particles is reduced, the liquid including particles having a larger particle diameter than that of in the related art can be used. Similarly, in the related art, there are restrictions on the particle concentration of the particles included in the liquid in order to prevent the clogging caused by the particles. However, in the liquid discharging apparatus 1, since the clogging caused by particles is reduced, the liquid including particles having a higher particle concentration than that of in the related art can be used.

Further, in the liquid discharging apparatus 1, since the pressurization operation can be performed in the state in which the nozzle N is sealed, the ink consumption can be reduced as compared with the case where the clogging caused by the particles is eliminated while discharging the ink from the nozzle N. Further, for example, in a case where the clogging that is caused by the particles occurs in the relay flow path 75A, even when the ink is discharged from the nozzle N to eliminate the clogged particles, the clogging caused by the particles may not be eliminated. In this case, the ink is not supplied from the common liquid chamber 74A to the pressure chamber 77A, and air is sucked from the nozzle N, thereby air bubbles are generated inside the individual flow path 71. When the air bubbles are mixed inside the individual flow path 71, a discharge failure may occur in the subsequent discharging operation. However, in the liquid discharging apparatus 1, since the pressurization operation is performed in the state in which the nozzle N is sealed, the suction of the air from the nozzle N is reduced, and the possibility that the air bubbles are generated inside the individual flow paths 71 is reduced. As a result, the possibility of the discharge failure in the liquid discharging apparatus 1 is reduced.

Next, the average particle diameter of the coloring material included in the liquid will be described. The average particle diameter of the coloring material included in the liquid is, for example, 2 μm or more. The average particle diameter is more preferably 4.5 μm or more. The average particle diameter of the coloring material included in the liquid is, for example, 10 μm or less. The average particle diameter can be calculated by using, for example, the particle diameter measurement method according to JIS Z8825. The average particle diameter may be a value measured by using another method such as an image analysis method or a centrifugal sedimentation method. Since the liquid discharging apparatus 1 can reduce the clogging caused by particles, it is possible to use a liquid including particles having a larger particle diameter as compared with that of the related art.

The relay flow paths 75A and 75B may include a part extending in the X axis direction. The common liquid chambers 74A and 74B may not include a part extending in the X axis direction.

Figure 12:
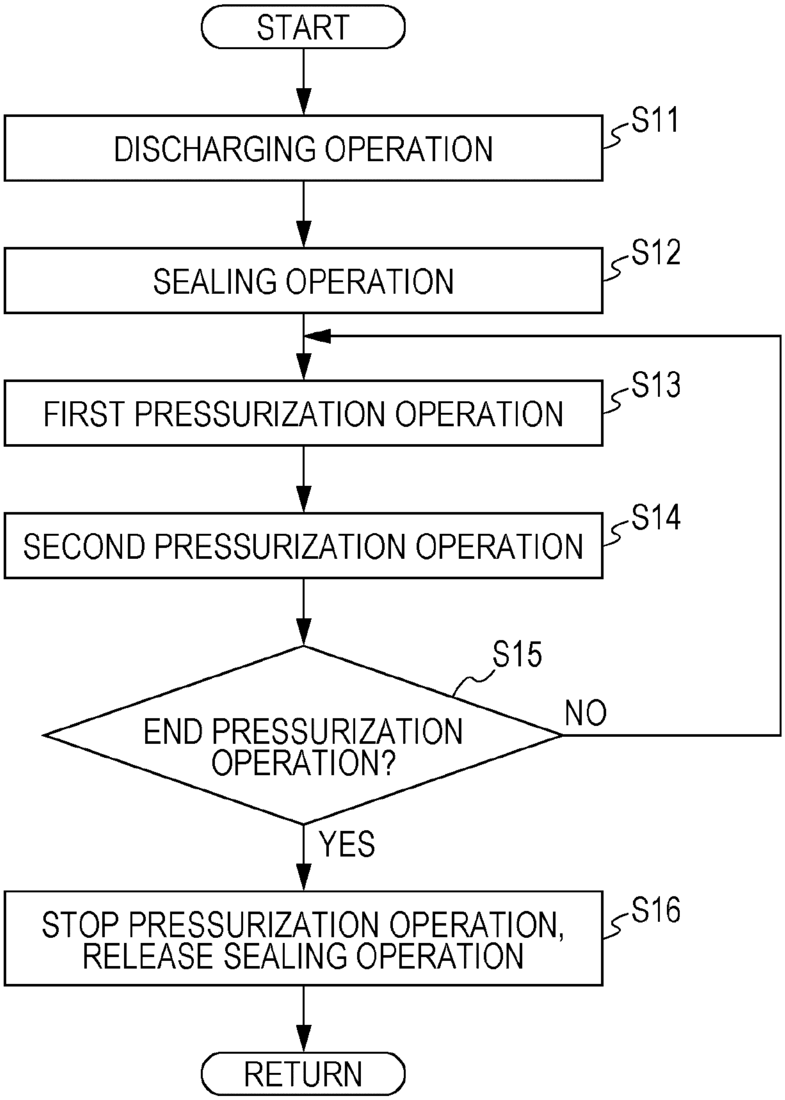
FIG. 12 is a flowchart illustrating a control flow by a control portion according to Example 1.

Next, with reference to FIG. 12, the control flow by the control portion 30 according to Example 1 will be described. FIG. 12 is a flowchart illustrating a processing procedure in the control portion 30. The liquid discharging apparatus 1 can alternately perform the reverse flow of the ink and the normal flow of the ink in the state in which the nozzle N is sealed by the sealing portion 85.

As illustrated in FIG. 12, the control portion 30 controls the discharging operation in step S11. The nozzle N is not sealed by the sealing portion 85 when the discharging operation is performed. In step S11, the control portion 30 drives the piezoelectric actuator 50 to cause the pressure of the ink inside the pressure chambers 77A and 77B to fluctuate and discharge the ink from the nozzle N. The ink inside the pressure chamber 77A passes through the communication flow paths 78A and 78C and is discharged from the nozzle N. The ink inside the pressure chamber 77B passes through the communication flow paths 78B and 78C and is discharged from the nozzle N.

After the discharging operation is ended, the control portion 30 makes the process proceeds to step S12 to perform the sealing operation. The control portion 30 controls the carriage transport mechanism 4 to transport the carriage 3. The control portion 30 moves the liquid discharging head 20 onto the sealing portion 85. As a result, the nozzle N is sealed by the sealing portion 85.

The control portion 30 controls a first pressurization operation in step S13. In the first pressurization operation, the control portion 30 drives the pump 84 to allow the ink to flow reversely. By the first pressurization operation, the ink inside the common liquid chamber 73B can be pressurized from the exhaust port 72B side. By the first pressurization operation, the ink can be pressurized from the common liquid chamber 74B toward the pressure chamber 77B. By the first pressurization operation, the ink can be pressurized from the pressure chamber 77A toward the common liquid chamber 74A. As a result, the clogging caused by particles at the boundary between the relay flow path 75A and the common liquid chamber 74A can be reduced.

The control portion 30 controls a second pressurization operation in step S14. In the second pressurization operation, the control portion 30 drives the pump 83 to allow the ink to flow normally. By the second pressurization operation, the ink inside the common liquid chamber 73A can be pressurized from the supply port 72A side. By the second pressurization operation, the ink can be pressurized from the common liquid chamber 74A toward the pressure chamber 77A. As a result, the clogging caused by particles at the boundary between the relay flow path 75A and the common liquid chamber 74A can be reduced. Further, by the second pressurization operation, the ink can be pressurized from the pressure chamber 77B toward the common liquid chamber 74B.

In step S15, the control portion 30 determines whether or not to end the pressurization operation. The control portion 30 determines, for example, to end the pressurization operation when the pressurization operation is performed a preset number of times. The control portion 30 does not determine to end the pressurization operation when the pressurization operation is not performed the preset number of times. When the pressurization operation is not ended, the control portion 30 performs the first pressurization operation and the second pressurization operation by repeating steps S13 and S14. As a result, the first pressurization operation and the second pressurization operation can be alternately and repeatedly performed. The particles present at the boundary between the relay flow path 75A and the common liquid chamber 74A can be pressurized from the pressure chamber 77A and then pressurized from the common liquid chamber 74A. In the liquid discharging apparatus 1, the clogging caused by particles can be eliminated by alternately pressurizing in different directions by alternately performing reverse flow and normal flow.

After the first pressurization operation and the second pressurization operation are performed the preset number of times, the process proceeds to step S16, and the control portion 30 stops the second pressurization operation and releases the sealing operation. The control portion 30 stops the pump 83 and ends the second pressurization operation. The control portion 30 moves the carriage 3 to release a sealing state by the sealing portion 85.

As described above, in the liquid discharging apparatus 1, the clogging caused by particles can be reduced by alternately performing the first pressurization operation and the second pressurization operation. As a result, the pressurization directions can be alternately changed and pressurization is possible from both sides, respectively. For example, even when the flow path is clogged due to particles, the clogging caused by the particles can be suitably eliminated by alternately changing the directions in the opposite direction and pressurizing a plurality of times.

Next, the control by the control portion 30 according to Example 2 will be described. The control portion 30 according to Example 2 may control the common liquid chamber 73A to depressurize in the first pressurization operation. The control portion 30 may perform depressurization by driving the pump 83, for example, and sucking the ink inside the common liquid chamber 73A from the supply port 72A. For example, the control portion 30 may control the pump 83 to rotate in the direction opposite to the case where the ink flows in the normal direction. The control portion 30 may depressurize the common liquid chamber 73A by using another method. The liquid discharging apparatus 1 may include a depressurization device for depressurizing the common liquid chamber 73A.

In the liquid discharging apparatus 1, in the first pressurization operation, the common liquid chamber 73A can be depressurized while the common liquid chamber 73B is pressurized. In the liquid discharging apparatus 1, the depressurization can be performed from the common liquid chamber 73A side. As a result, in the liquid discharging apparatus 1, the pressurization force from the pressure chamber 77A toward the common liquid chamber 74A can be increased. In other words, in the liquid discharging apparatus 1, the pressurization force for pressurizing the liquid inside the common liquid chamber 74A from the individual flow path side can be increased.

Next, the control by the control portion 30 according to Example 3 will be described. In the first pressurization operation, the control portion 30 according to Example 3 may control such that a pressurization force P1 when pressurizing the ink from the common liquid chamber 73B toward the pressure chamber 77A is larger than a pressurization force P2 applied to the ink inside the pressure chamber 77A in the discharging operation. The pressurization force P1 when pressurizing the ink from the common liquid chamber 73B toward the pressure chamber 77A can be controlled by changing the discharge pressure of the pump 84. The pressurization force P1 is an example of a pressurization force when pressurizing the ink from the common exhaust flow path side. The pressurization force P2 applied to the ink inside the pressure chamber 77A in the discharging operation can be changed by controlling the vibration caused by the piezoelectric actuator 50. The control portion 30 may control the vibration caused by the piezoelectric actuator 50 by changing a current value or a voltage value supplied to the piezoelectric actuator 50.

As described above, the control portion 30 can make the pressurization force P1, which is applied to the ink inside the pressure chamber 77A in the discharging operation, larger than the pressurization force P2, which is applied to the ink inside the pressure chamber 77A in the first pressurization operation. As a result, in the liquid discharging apparatus 1, the pressure can be applied from the pressure chamber 77A toward the common liquid chamber 73A to reduce the clogging caused by particles. In Example 3, it is possible to reduce the clogging caused by particles by pressurizing the liquid at a higher pressure as compared with the case where the liquid is pressurized by using the piezoelectric actuator 50.

Figure 13:
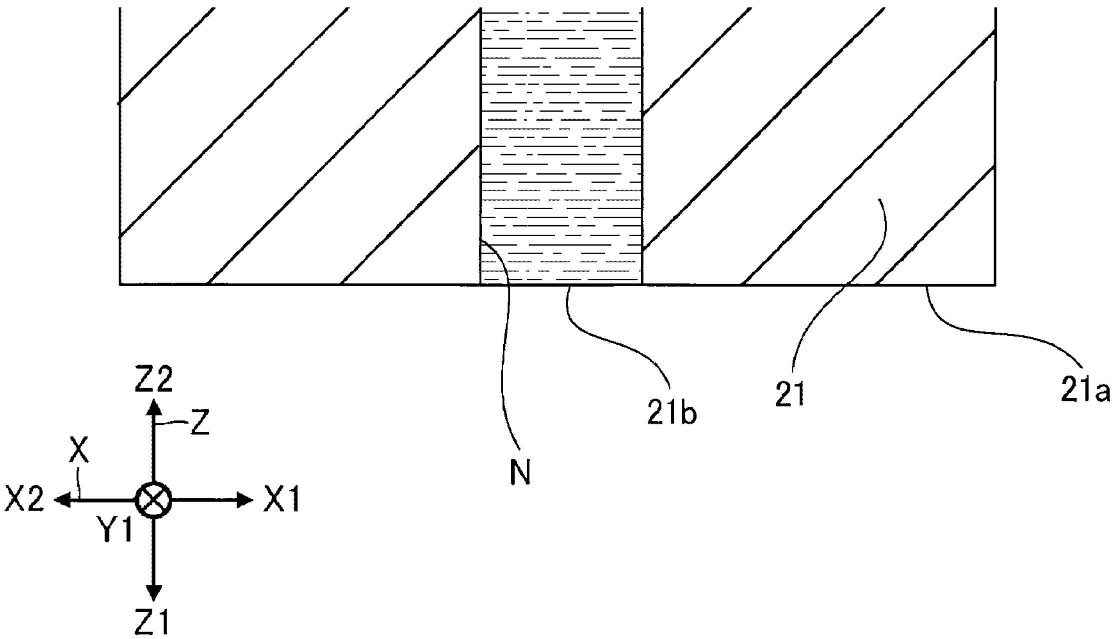
FIG. 13 is a cross-sectional view illustrating a nozzle plate and is a view illustrating a meniscus of ink inside a nozzle.

Next, the control by the control portion 30 according to Example 4 will be described. The control portion 30 according to Example 4 can control the first pressurization operation so as to exceed the pressurization force P3 when the meniscus in the nozzle N collapses when the nozzle N is not sealed. FIG. 13 is a cross-sectional view of the nozzle plate 21 and is a view illustrating the meniscus of the ink inside the nozzle N. The meniscus is the liquid surface of the ink.

In FIG. 13, the meniscus of the ink inside the nozzle N is present at a position of the opening 21*b* of the nozzle N. When the pressure of the ink inside the communication flow path 78C increases, the pressure of the ink inside the nozzle N also increases, and the meniscus protrudes in the Z1 direction. Further, when the pressure of the ink inside the nozzle N increases, the meniscus moves in the Z1 direction, the meniscus collapses, and the ink drips from the nozzle N. The pressurization force P3 applied to the ink at this time is the pressurization force P3 when the meniscus collapses. The control portion 30 can control such that the pressurization force in the first pressurization operation exceeds the pressurization force P3 when the meniscus collapses. As described above, in the liquid discharging apparatus 1, the clogging of the flow path caused by the particles can be reduced by pressurizing the liquid with the pressurization force exceeding the pressurization force P3 when the meniscus inside the nozzle N collapses.

In the related art, the sedimentation and aggregation caused by particles can be reduced by circulating the ink such that the ink flow always occurs inside the individual flow path 71. In this case, the ink is circulated at a pressure such that the meniscus inside the nozzle N does not collapse. In the liquid discharging apparatus 1, since the ink inside the individual flow paths 71 can be pressurized in the state in which the plurality of nozzles N are sealed, the ink can be pressurized with the pressurization force exceeding the pressurization force P3 when the meniscus collapses. In the liquid discharging apparatus 1, the clogging caused by particles can be suitably reduced by applying such a high pressurization force to the ink.

In the liquid discharging apparatus 1, during the discharging operation, the pressure of the nozzle N may be set to less than the atmospheric pressure by depressurizing to some extent so that the ink does not drip from the non-discharge nozzle N. At this time, since the adverse effects such as entering air bubbles may occur when the depressurization is continuously applied, the pressurization is also performed to some extent. At this time, the depressurization is substantially −50 [kPa] and the pressurization is substantially +50 [kPa]. In contrast to this, in the first pressurization operation, the ink does not drip because the nozzle N is sealed, thereby it is not necessary to perform depressurization. Regarding the pressurization, in order to reduce the clogging of the flow path caused by particles as described above, a large pressure such as +200 [kPa] or +1 [MPa] is applied as the pressurization force P3.

Figure 14:
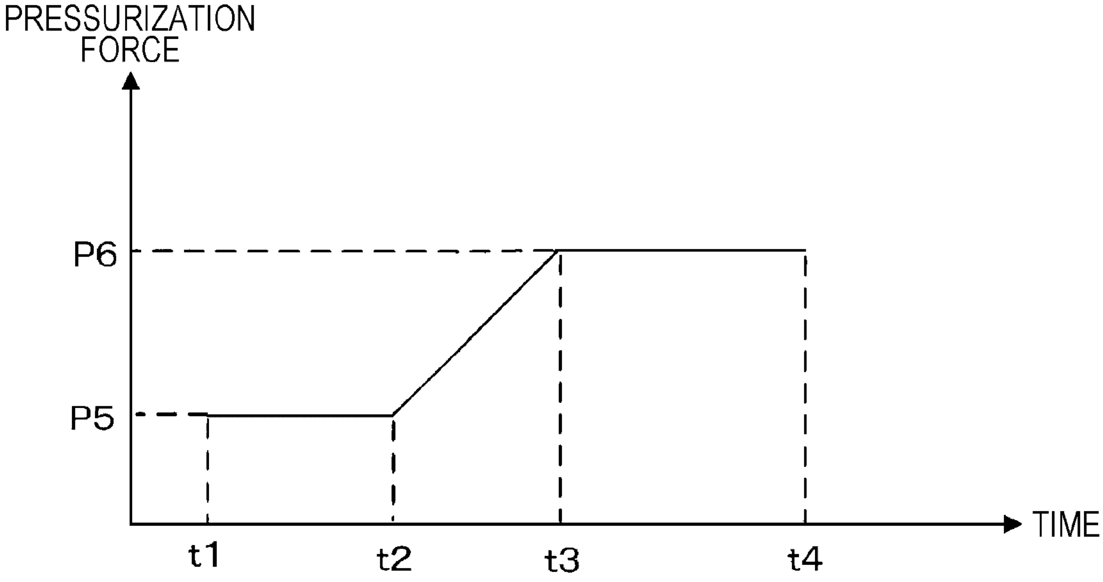
FIG. 14 is a graph illustrating changes in a pressurization force during a pressurization operation.

Next, the control by the control portion 30 according to Example 5 will be described. In Example 5, in the first pressurization operation, the control portion 30 can control the pressurization force, when pressurizing the ink from the common liquid chamber 73B toward the pressure chamber 77A in the state in which the nozzle N is sealed, to increase in the middle of the first pressurization operation. FIG. 14 is a graph illustrating changes in the pressurization force during the first pressurization operation. In FIG. 14, the horizontal axis illustrates the passage of time, and the vertical axis illustrates the pressurization force.

In the first pressurization operation, the control portion 30 controls the pump 84 to pressurize the ink inside the common liquid chamber 73B from the exhaust port 72B. The control portion 30 pressurizes the ink with the pressurization force P5 from the time t1 to the time t2. The control portion 30 increases the pressurization force from time t2 to time t3. The control portion 30 controls to increase the pressurization force to become the pressurization force P6 at the time t3. The pressurization force P6 is a higher value than the pressurization force P5. The control portion 30 pressurizes the ink with the pressurization force P6 from the time t3 to the time t4.

In this way, the control portion 30 may change the pressurization force in the first pressurization operation. The control portion 30 may control the pressurization forces P5 and P6 to be alternately changed in the first pressurization operation. The pressurization force in the first pressurization operation may be changed from time t1 to time t2. Similarly, the pressurization force in the first pressurization operation may be changed from time t3 to time t4.

Figure 15:
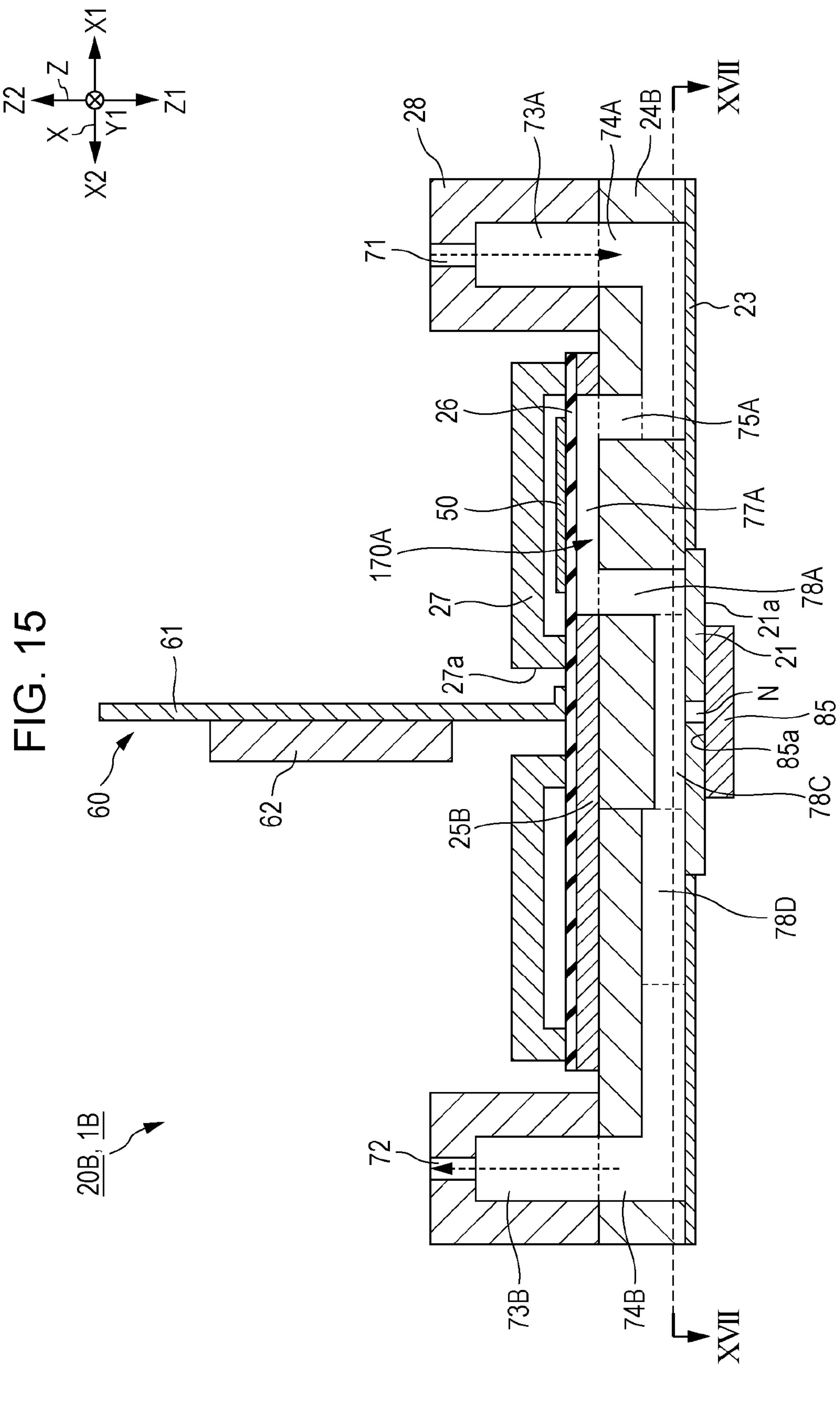
FIG. 15 is a cross-sectional view illustrating the liquid discharging head of the liquid discharging apparatus according to a second embodiment and is a view illustrating an individual flow path including a pressure chamber 77A.
Figure 16:
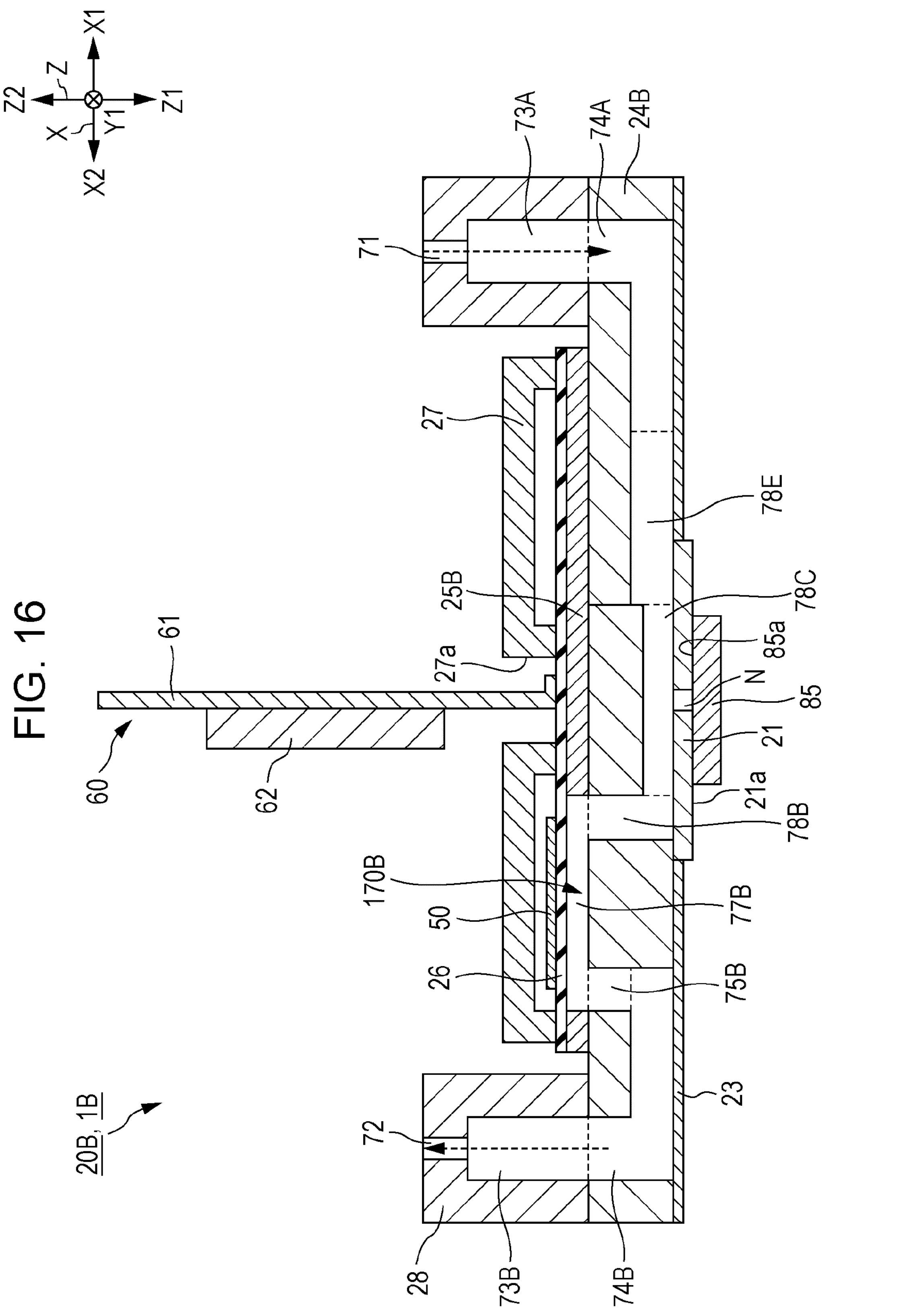
FIG. 16 is a cross-sectional view illustrating the liquid discharging head of the liquid discharging apparatus according to the second embodiment and is a view illustrating an individual flow path including a pressure chamber 77B.
Figure 17:
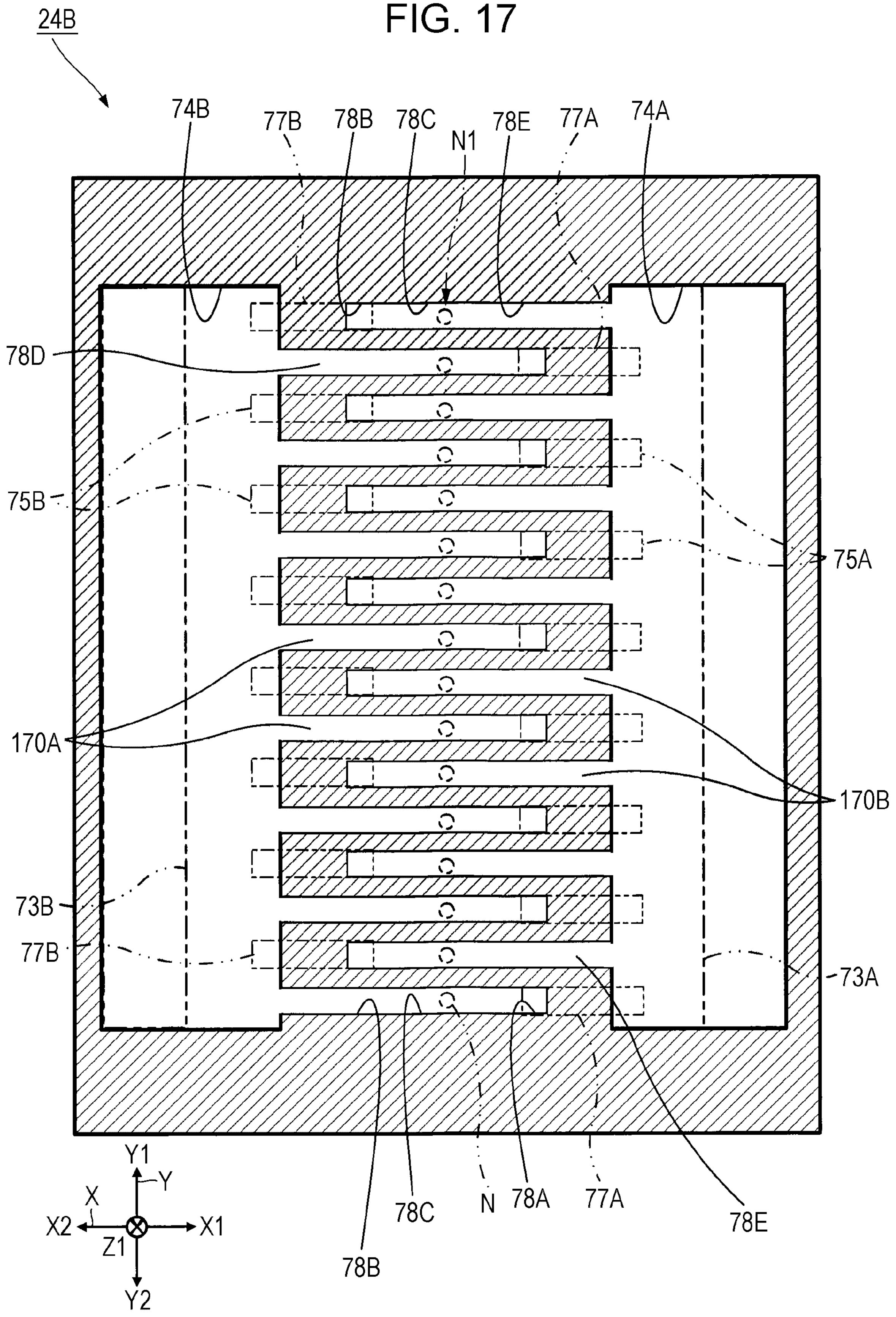
FIG. 17 is a cross-sectional view illustrating a communication plate and is a view illustrating a cross section taken along the line XVII-XVII in FIG. 15.

Next, a liquid discharging apparatus 1B according to a second embodiment will be described. FIGS. 15 and 16 are cross-sectional views illustrating the liquid discharging head 20B of the liquid discharging apparatus 1B according to the second embodiment. FIG. 17 is a cross-sectional view illustrating the communication plate 24B of the liquid discharging head 20B and is a cross-sectional view taken along the line XVII-XVII in FIG. 15. The difference between the liquid discharging head 20B of the second embodiment and the liquid discharging head 20 of the first embodiment is that one pressure chamber is provided for one individual flow path. In the description of the second embodiment, the same description as that of the first embodiment will be omitted.

The liquid discharging head 20B includes a communication plate 24B and a pressure chamber formation plate 25B. The liquid discharging head 20B is provided with a plurality of individual flow paths 170A and 170B. FIG. 15 illustrates the individual flow path 170A, and FIG. 16 illustrates the individual flow path 170B. The individual flow paths 170A and 170B are disposed alternately in the Y axis direction. The individual flow path 170A illustrated in FIG. 15 includes the relay flow path 75A, the pressure chamber 77A, and the communication flow paths 78A, 78C, and 78D. The communication flow path 78D extends in the X axis direction and makes the communication flow path 78C and the common liquid chamber 74B communicate with each other. The individual flow path 170B illustrated in FIG. 16 includes the communication flow paths 78C and 78E, the pressure chamber 77B, and the relay flow path 75B. The communication flow path 78E extends in the X axis direction and makes the common liquid chamber 74A and the communication flow path 78C communicate with each other. The common liquid chambers 74A and 74B, the relay flow paths 75A and 75B, and the communication flow paths 78A to 78E are formed in the communication plate 24B. The pressure chambers 77A and 77B are formed in the pressure chamber formation plate 25B.

The control portion 30 controls the discharging operation and the pressurization operation. The control portion 30 drives the piezoelectric actuator 50 to control the discharging operation when the printing is performed. The ink inside the pressure chamber 77A passes through the communication flow paths 78A and 78C and is discharged from the nozzle N. The ink inside the pressure chamber 77B passes through the communication flow paths 78B and 78C and is discharged from the nozzle N.

The control portion 30 controls the first pressurization operation so as to pressurize the ink inside the common liquid chambers 73B and 74B in the state in which the nozzle N is sealed by the sealing portion 85 when the maintenance is performed. In the first pressurization operation, the ink inside the common liquid chamber 74B is pressurized, so that the ink inside the individual flow paths 170A and 170B is pressurized toward the common liquid chamber 74A. The ink inside the relay flow path 75A is pressurized toward the common liquid chamber 74A. As a result, the particles can be pushed out from the relay flow path 75A toward the common liquid chamber 74A, and the clogging of the flow path caused by the particles can be reduced. The ink inside the communication flow path 78E is pressurized toward the common liquid chamber 74A. As a result, the particles can be pushed out from the communication flow path 78E toward the common liquid chamber 74A, and the clogging of the flow path caused by the particles can be reduced. The control portion 30 can control the pressurization operation of pressurizing the liquid inside the common liquid chamber 74A from the individual flow paths 170A and 170B sides.

The control portion 30 controls the second pressurization operation so as to pressurize the ink inside the common liquid chambers 73A and 74A in the state in which the nozzle N is sealed by the sealing portion 85 when the maintenance is performed. In the second pressurization operation, the ink inside the common liquid chamber 74A is pressurized, so that the ink inside the individual flow paths 170A and 170B is pressurized toward the common liquid chamber 74B. The ink inside the communication flow path 78D illustrated in FIG. 15 is pressurized toward the common liquid chamber 74B. As a result, the particles can be pushed out from the communication flow path 78D toward the common liquid chamber 74B, and the clogging of the flow path caused by the particles can be reduced. The ink inside the relay flow path 75B illustrated in FIG. 16 is pressurized toward the common liquid chamber 74B. As a result, the particles can be pushed out from the relay flow path 75B toward the common liquid chamber 74B, and the clogging of the flow path caused by the particles can be reduced. The control portion 30 can control the pressurization operation of pressurizing the liquid inside the common liquid chamber 74B from the individual flow paths 170A and 170B sides.

The liquid discharging apparatus 1 according to the second embodiment also has the same effect as the liquid discharging apparatus 1 of the first embodiment.

Figure 18:
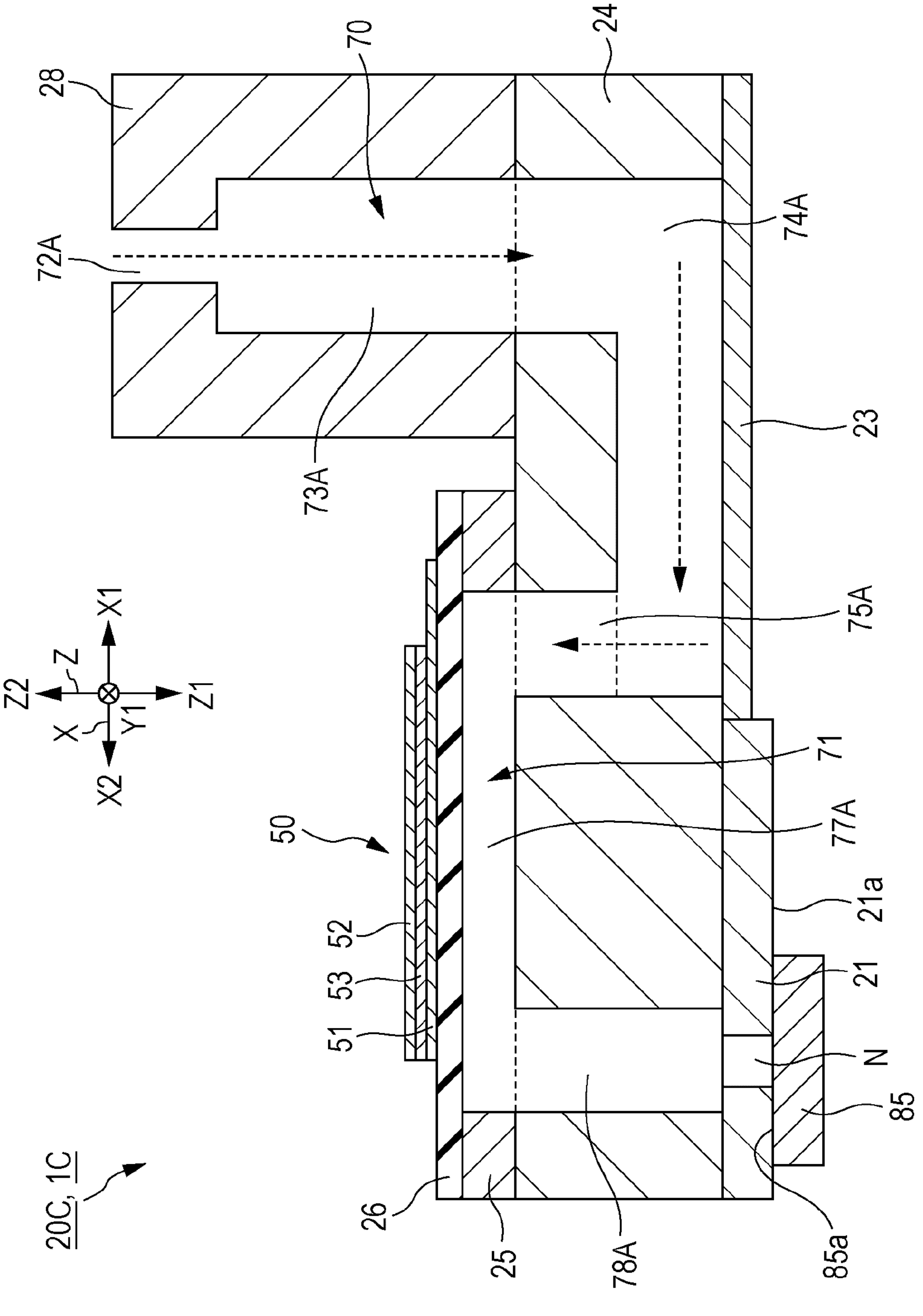
FIG. 18 is a cross-sectional view illustrating the liquid discharging head of the liquid discharging apparatus according to a third embodiment and is a view illustrating a state in which a nozzle is sealed by a sealing portion.

Next, a liquid discharging apparatus 1C according to a third embodiment will be described. FIG. 18 is a cross-sectional view illustrating a liquid discharging head 20C of the liquid discharging apparatus 1C according to the third embodiment. The liquid discharging apparatus 1C according to the third embodiment is different from the liquid discharging apparatus 1 of the first embodiment in that the liquid discharging head 20C is provided instead of the liquid discharging head 20, the ink circulation flow path is not provided, and the control of the pressurization operation by the control portion 30 is different. In the pressurization operation of the third embodiment, the piezoelectric actuator 50 is driven in the state in which the plurality of nozzles N are sealed to pressurize the ink inside the pressure chamber 77A. In the description of the third embodiment, the same description as that of the first embodiment may be omitted.

The flow path 70 of the ink in the liquid discharging head 20C includes the supply port 72A, the common liquid chambers 73A and 74A, the relay flow path 75A, the pressure chamber 77A, the communication flow path 78A, and the nozzle N. The communication flow path 78A makes the pressure chamber 77A and the nozzle N communicate with each other. The flow path 70 includes the individual flow path 71. The individual flow path 71 includes the relay flow path 75A, the pressure chamber 77A, the communication flow path 78A, and the nozzle N.

The liquid discharging head 20C is controlled by the control portion 30. The control portion 30 controls the discharging operation of discharging the liquid from the plurality of nozzles N by driving the piezoelectric actuator 50, and controls the pressurization operation of pressurizing the liquid from the plurality of pressure chambers 77A toward the common liquid chamber 74A by driving the piezoelectric actuator 50 in a state in which the plurality of nozzles N are sealed by the sealing portion 85.

The control portion 30 drives the piezoelectric actuator 50 to cause the pressure fluctuation of the ink inside the pressure chamber 77A and discharge the ink, when the printing is performed. When the printing is performed, the nozzle N is not sealed by the sealing portion 85. The ink inside the pressure chamber 77A passes through the communication flow path 78A and is discharged from the nozzle N.

The control portion 30 controls the pressurization operation of pressurizing the ink from the pressure chamber 77A toward the common liquid chamber 74A by driving the piezoelectric actuator 50 in the state in which the nozzle N is sealed by the sealing portion 80 when the maintenance is performed. In this case, since the nozzle N is sealed, the ink is not discharged from the nozzle N. Since the piezoelectric actuator 50 is driven in the state in which the nozzle N is sealed, the ink inside the pressure chamber 77A is pressurized, and the ink inside the relay flow path 75A is pressurized toward the common liquid chamber 74A.

According to the liquid discharging apparatus 1C of the third embodiment, it is possible to cause the pressure of the ink inside the pressure chamber 77A to fluctuate by driving the piezoelectric actuator 50 in the state in which the nozzle N is sealed. As a result, the pressure of the ink inside the pressure chamber 77A is transmitted to the ink inside the relay flow path 75A, and the ink inside the relay flow path 75A is pressurized toward the common liquid chamber 74A. For example, the particles present at the boundary between the relay flow path 75A and the common liquid chamber 74A are pushed into the common liquid chamber 74A. Therefore, in the liquid discharging head 20C, the clogging of the flow path caused by particles is reduced.

In the liquid discharging apparatus 1C, since the ink inside the pressure chamber 77A can be pressurized by driving the piezoelectric actuator 50 in the state in which the plurality of nozzles N are sealed, the ink can be pressurized with a stronger pressurization force than when the pressurization is performed in the state in which the nozzle N is not sealed. For example, the liquid can be pressurized with a higher pressurization force than the pressurization force when the meniscus inside the nozzle N collapses in the state in which the nozzle N is not sealed.

Further, in the liquid discharging apparatus 1C, when the pressurization operation is performed in the state in which the plurality of nozzles N are sealed, a frequency of a drive pulse supplied to the piezoelectric actuator 50 may be, for example, a frequency that resonates with a natural vibration cycle Tc. By supplying the drive pulse having such a frequency to the piezoelectric actuator 50 to resonate the ink inside the individual flow path 71, the clogging caused by particles can be effectively eliminated.

The natural vibration cycle Tc is calculated by using, for example, the following equation (1). In the equation (1), the direction of the unit length is, for example, along the vibration direction of the ink. Wherein Ms is the equivalent inertial mass [$kg/m^4$] inside the relay flow path 75A that supplies the ink to the pressure chamber 77A. Ci is a volume change of the ink [$m^3/Pa$] per unit pressure inside the pressure chamber 77A. Cv is a volume change of the pressure chamber [$m^3/Pa$] per unit pressure inside the pressure chamber 77A.

$$Tc=2\pi\{Ms\times(Ci+Cv)\}^{1/2} \quad (1)$$

Next, the control by the control portion 30 according to Example 6 will be described. The control portion 30 according to Example 6 can change at least one of the amplitude and the frequency of the drive pulse applied to the plurality of piezoelectric actuators 50 in the pressurization operation according to the type of the liquid supplied to the pressure chamber 77A. The control portion 30 may change both the amplitude and the frequency of the drive pulse according to the type of the liquid. The control portion 30 may change the amplitude or frequency of the drive pulse according to the type of the liquid. The type of the liquid can be classified according to, for example, the properties of the liquid, the particle diameter of the particles included in the liquid, the concentration of the liquid, and the like.

As illustrated in FIG. 2, the liquid discharging apparatus 1 includes an input portion 35 and a display portion 36. The input portion 35 and the display portion 36 are electrically coupled to the control portion 30. The input portion 35 may be a button operated by a user. The display portion 36 receives information from the control portion 30 and displays the information. The display portion 36 may be a liquid crystal display portion. The input portion 35 may be a touch panel. The user can operate the input portion 35 to select the liquid to be supplied to the pressure chamber 77A. The control portion 30 can change the amplitude and the frequency of the drive pulse applied to the piezoelectric actuator 50 in the pressurization operation in the selected liquid type.

Figure 19:
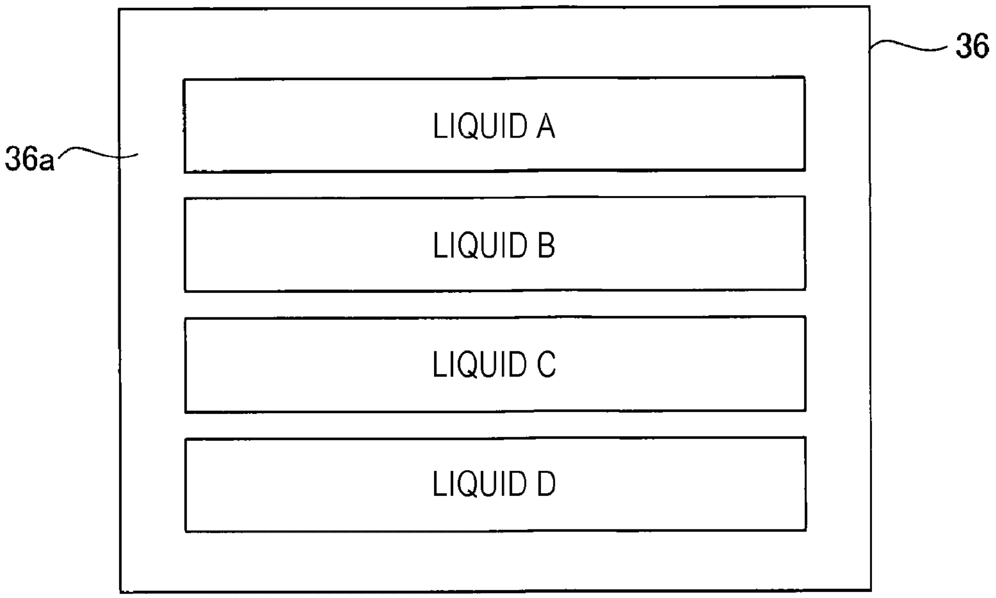
FIG. 19 is a view illustrating a liquid selection screen displayed on a display portion.

FIG. 19 is a view illustrating a selection screen 36*a* displayed on the display portion 36. The user can select the liquid to be supplied to the pressure chamber 77A by referring to the selection screen 36*a* displayed on the display portion 36. On the selection screen 36*a* of the display portion 36, for example, a liquid name such as "liquid A", "liquid B", "liquid C", or "liquid D" is displayed. The control portion 30 can change an operation mode according to the type of the liquid. The control portion 30 can change the amplitude and the frequency of the drive pulse applied to the piezoelectric actuator 50 by changing the operation mode.

Figure 20:
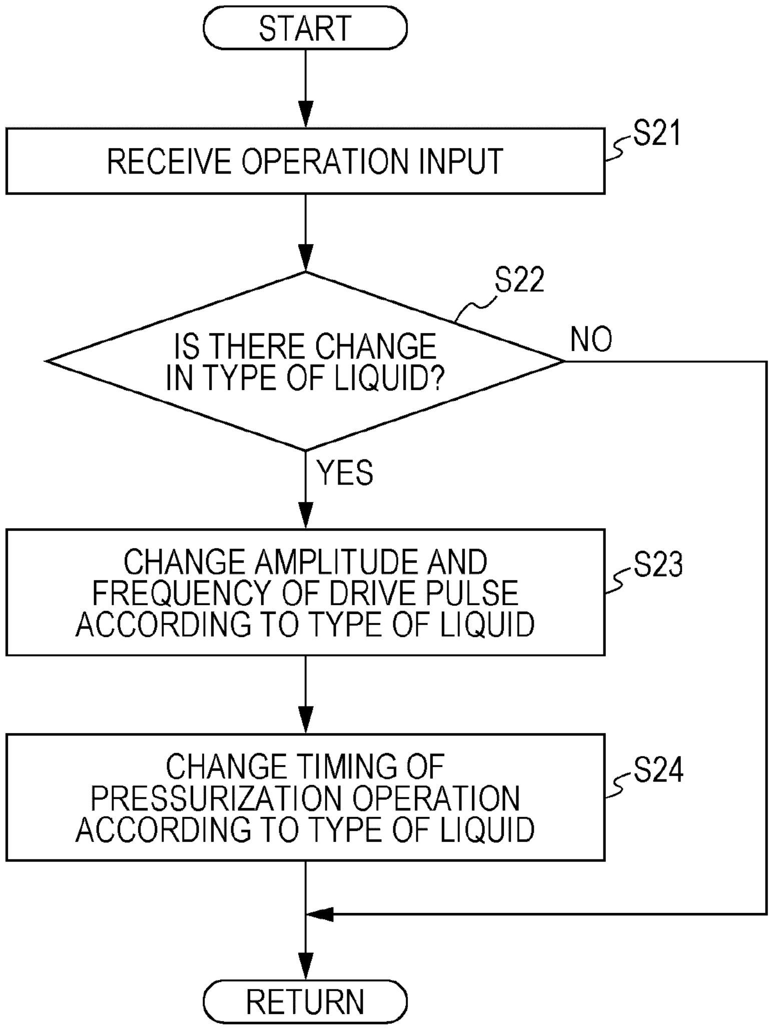
FIG. 20 is a flowchart illustrating a control flow by the control portion according to Example 6.

FIG. 20 is a flowchart illustrating a control flow by the control portion 30 according to Example 6. In step S21, the control portion 30 receives a signal from the input portion 35 and receives an operation input by the user. In step S22, the control portion 30 determines whether or not there is a change in the type of the liquid based on the signal received from the input portion 35. The control portion 30 makes the process proceeds to step S23 when there is a change in the type of the liquid and makes the process ends when there is no change in the type of the liquid.

In step S23, the control portion 30 changes the amplitude and the frequency of the drive pulse according to the type of the liquid. In step S24, the control portion 30 changes a timing of the pressurization operation according to the type of the liquid. Examples of the timing of the pressurization operation include a start timing of the pressurization operation, an end timing of the pressurization operation, an interval of the pressurization operation, and the like. The control portion 30 may change the number of times of pressurization operations according to the type of the liquid.

As described above, the liquid discharging apparatus 1C can change the amplitude and the frequency of the drive pulse applied to the piezoelectric actuator 50 in the pressurization operation according to the type of the liquid. The control portion 30 can control so as to change the pressure fluctuation of the liquid inside the pressure chamber 77A according to the type of the liquid. By changing the amplitude and the frequency of the drive pulse, the displacement amount and the displacement speed of the vibrating plate 26 can be changed, and the pressure fluctuation of the liquid inside the pressure chamber 77A can be changed. The control portions 30 of the liquid discharging apparatuses 1 and 1B may perform control to change the pressurization force in the pressurization operation according to the type of the liquid. The larger the pressurization force, the easier it is to eliminate the clogging caused by particles. The higher the frequency of the drive pulse, the easier it is to eliminate the clogging caused by particles.

Figure 21:
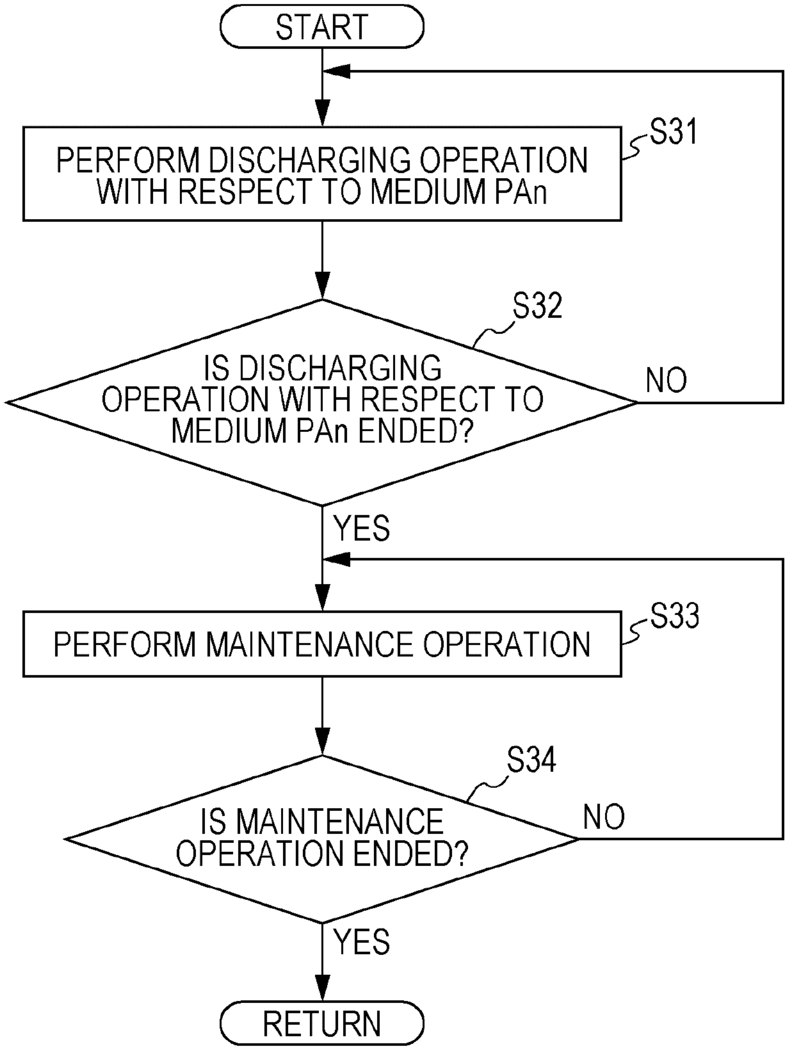
FIG. 21 is a flowchart illustrating a control flow by the control portion according to Example 7.

Next, the control by the control portion 30 according to Example 7 will be described. The control portion 30 according to Example 7 controls to perform the pressurization operation after the end of the discharging operation with respect to a medium PAn and before the start of the discharging operation with respect to the next medium PAn+1 of the medium PAn. The medium PAn is an example of a first medium. The medium PAn+1 is an example of a second medium. "n" is a natural number. FIG. 21 is a flowchart illustrating a control flow by the control portion 30 according to Example 7. A case where Example 7 is applied to the liquid discharging apparatus 1C according to the third embodiment will be described. The control by the control portion 30 according to Example 7 can be applied to the liquid discharging apparatuses 1 and 1B.

In step S31, the control portion 30 performs the discharging operation with respect to the medium PAn. As a result, the liquid discharging apparatus 1C discharges the ink to the medium PAn to perform printing. In step S32, the control portion 30 determines whether or not the discharging operation with respect to the medium PAn is ended. When the discharging operation with respect to the medium PAn is ended, the process proceeds to step S33, and when the discharging operation with respect to the medium PAn is not ended, the process returns to step S31 to continue the discharging operation with respect to the medium PAn.

In step S33, the control portion 30 performs the maintenance operation. The control portion 30 controls the carriage transport mechanism 4 to transport the carriage 3. The control portion 30 moves the carriage 3 to seal the nozzle N by the sealing portion 85. The control portion 30 drives the piezoelectric actuator 50 to cause the pressure of the ink inside the pressure chamber 77A to fluctuate. As a result, the pressure of the ink inside the pressure chamber 77A is transmitted to the ink inside the relay flow path 75A, and the ink inside the relay flow path 75A is pressurized toward the common liquid chamber 74A. In the maintenance operation, other operations may be performed instead of the pressurization operation.

In step S34, the control portion 30 determines whether or not the maintenance operation is ended. When the maintenance operation is ended, the current process is ended. When the maintenance operation is not ended, the control portion 30 makes the process return to step S33 and continues the maintenance operation.

After the maintenance operation is ended, the control portion 30 makes the process return to step S31 again and performs the discharging operation with respect to the medium PAn+1 next to the medium PAn. The control portion 30 can repeat the processes in steps S31 to S34.

In this way, the control portion 30 can control to perform the pressurization operation after the end of the discharging operation with respect to a medium PAn and before the start of the discharging operation with respect to the next medium PAn+1 of the medium PAn.

The above-described embodiments merely illustrate a typical embodiment of the present disclosure, and the present disclosure is not limited to the above-described embodiments, and various changes and additions can be made without departing from the gist of the present disclosure.

In the above-described embodiments, although the serial type liquid discharging apparatus 1 in which the carriage 3 on which the liquid discharging head 20 is mounted is reciprocated in the width direction of the medium PA is illustrated, the present disclosure may be applied to a line type liquid discharging apparatus including a line head in which the liquid discharging heads 20 are arranged in a predetermined direction.

In the liquid discharging apparatus 1 described above, although the pressurization operation of pressurizing the liquid from the pressure chamber 77A toward the common liquid chamber 74A is performed by using the pump 84 in the state in which the plurality of nozzles N are sealed, the method for pressurizing the liquid in the pressurization operation is not limited to the pump. For example, other pressurizing methods may be used to perform the pressurization operation. Further, the pressurization operation by the pump 84 and the pressurization operation by the piezoelectric actuator 50 may be alternately performed with respect to the liquid discharging head 20. Further, the pressurization operation by the pump 84 and the pressurization operation by the piezoelectric actuator 50 may be performed with respect to the liquid discharging head 20 at the same time.

The liquid discharging apparatus 1 exemplified in the above-described embodiment can be adopted not only in an apparatus dedicated to printing but also in various apparatus such as a facsimile apparatus and a copying machine. Moreover, the application of the liquid discharging apparatus of the present disclosure is not limited to printing. For example, a liquid discharging apparatus that discharges a solution of a coloring material is utilized as a manufacturing apparatus that forms a color filter of a display apparatus such as a liquid crystal display panel. Further, a liquid discharging apparatus that discharges a solution of a conductive material is utilized as a manufacturing apparatus that forms wiring or electrodes of a wiring substrate. Further, a liquid discharging apparatus that discharges a solution of an organic substance related to a living body is utilized, for example, as a manufacturing apparatus that manufactures a biochip.

In the above description, the average particle diameter of the particles included in the liquid is exemplified as 2 μm or more, but the average particle diameter of the particles included in the liquid is not limited to this. For example, when the environmental resistance is taken into consideration, it is better that the average particle diameter is large. The environmental resistance includes light resistance and water resistance. For example, when graininess is taken into consideration, it is better that the average particle diameter is small.

For example, when the bio-related liquid is applied to the liquid discharging apparatus, the liquid may include particles such as artificial red blood cells. The diameter of erythrocytes is, for example, substantially 7 to 8 μm, and the thickness of the erythrocytes is substantially 2 μm. The liquid discharging apparatus 1 may be used, for example, in the manufacturing process of the artificial red blood cells. For example, the use of the liquid discharging apparatus 1 is expected for the manufacturing of the artificial blood with higher accuracy than that of in the related art.

Examples of the particles included in the liquid applied to the liquid discharging apparatus 1 include a metallic tone pigment. For example, in order to develop a silver color, it is necessary to reflect all wavelengths in the visible light region, which requires a plane having a size sufficiently larger than the wavelength. Since the size of the visible light is substantially 0.4 to 0.7 μm, it is desired that the average particle diameter is 2 μm or more, which is sufficiently larger than the size of the visible light. The liquid discharging apparatus 1 may discharge the liquid including a metallic tone pigment having an average particle diameter of 2 μm or more.

Examples of the particles included in the liquid applied to the liquid discharging apparatus 1 include a pearl tone pigment. The pearl tone pigment is the same as the metallic tone, but since the pearl tone is reproduced by reflecting leaf-shaped mica in multiple layers at a plurality of intervals, a size that is one size larger than the metallic tone pigment is desired. The liquid discharging apparatus 1 may discharge the liquid including a pearl tone pigment having an average particle diameter of 2 μm or more.

The liquid discharging apparatus 1 may be applied to metal wiring or die bonding. Silver particle paste is used for bonding the metal wiring or IC chips. In recent years, there have been an increasing number of cases where silver particles with a level of several nm are used but there are concerns about the increase in environmental load and the impact on the human body in the manufacturing process of nano-silver particles. For example, in a case where the particle concentration is increased, since there is a correlation between particle size and viscosity, it has been reported that the viscosity of the liquid tends to increase remarkably particularly when the particle size is 1 μm or less. Thereby, in order to make the high-concentration dispersion liquid have a viscosity that can be discharged from the liquid discharging apparatus 1, it is desirable that the average particle diameter is 2 μm or more.

The liquid discharging apparatus 1 may be used, for example, in the technical field of a liquid crystal display or an adhesive gap agent. In order to secure the cell gap of the liquid crystal display or the adhesive intensity, it is desirable to precisely apply an adhesive agent in which particles of, for example, substantially 2 to 10 μm are kneaded.

What is claimed is:

1. A liquid discharging apparatus comprising:

a liquid discharging head discharging liquid from a plurality of nozzles;

a sealing portion configured to seal the plurality of nozzles; and a control portion controlling an operation of the liquid discharging head, wherein the liquid discharging head has a plurality of individual flow paths each having a pressure chamber that communicates with at least one of the plurality of nozzles, a common supply flow path that communicates in common with the plurality of individual flow paths and supplies the liquid to the plurality of individual flow paths, and the control portion controls (i) a discharging operation of discharging the liquid from the plurality of nozzles by driving an energy generation element that causes a pressure of the liquid inside the pressure chamber to fluctuate, and (ii) a pressurization operation of pressurizing the liquid from the individual flow path side in a state in which the plurality of nozzles are sealed by the sealing portion, wherein an average particle diameter of a coloring material included in the liquid is 2 μm or more.

2. The liquid discharging apparatus according to claim 1, wherein the liquid discharging head further includes a common exhaust flow path that communicates in common with the plurality of individual flow paths and exhausts the liquid flowing in from the plurality of individual flow paths, and the pressurization operation includes pressurizing the liquid from the common exhaust flow path side in the state in which the plurality of nozzles are sealed.

3. The liquid discharging apparatus according to claim 2, wherein the control portion controls to alternately perform pressurizing the liquid from the common exhaust flow path side and pressurizing the liquid from the common supply flow path side, in the state in which the plurality of nozzles are sealed in the pressurization operation.

4. The liquid discharging apparatus according to claim 2, wherein the control portion controls to perform depressurizing the liquid from the common supply flow path side while pressurizing the liquid from the common exhaust flow path side in the state in which the plurality of nozzles are sealed in the pressurization operation.

5. The liquid discharging apparatus according to claim 2, wherein the control portion controls such that a pressurization force when the liquid is pressurized from the common exhaust flow path side in the pressurization operation is larger than a pressurization force applied to the liquid inside the pressure chamber in the discharging operation.

6. The liquid discharging apparatus according to claim 2, wherein the control portion controls such that a pressurization force when the liquid is pressurized from the common exhaust flow path side in the state in which the plurality of nozzles are sealed in the pressurization operation exceeds a pressurization force when meniscuses in the plurality of nozzles collapse in a state in which the plurality of nozzles are not sealed.

7. The liquid discharging apparatus according to claim 2, wherein the control portion controls such that a pressurization force when the liquid is pressurized from the common exhaust flow path side in the state in which the plurality of nozzles are sealed in the pressurization operation is defined as a first pressure and then the pressurization force is increased to a second pressure that is higher than the first pressure.

8. The liquid discharging apparatus according to claim 2, further comprising:

a pump for pressurizing the liquid inside the common exhaust flow path, wherein the control portion controls to drive the pump to pressurize the liquid from the common exhaust flow path side in the pressurization operation.

9. The liquid discharging apparatus according to claim 1, wherein in the control portion, the pressurization operation includes pressurizing the liquid from the individual flow path side by pressurizing the liquid inside the pressure chamber in the state in which the plurality of nozzles are sealed.

10. The liquid discharging apparatus according to claim 1, wherein in the control portion, the pressurization operation includes pressurizing the liquid from the individual flow path side by driving the energy generation element to pressurize the liquid inside the pressure chamber.

11. The liquid discharging apparatus according to claim 1, wherein the control portion changes at least one of an amplitude and a frequency of a drive pulse applied to the energy generation element in the pressurization operation, according to a type of the liquid supplied to the pressure chamber.

12. The liquid discharging apparatus according to claim 1, wherein the control portion controls to perform the pressurization operation after an end of the discharging operation with respect to a first medium and before a start of the discharging operation with respect to a second medium following the first medium.

13. The liquid discharging apparatus according to claim 1, wherein the control portion changes a timing of performing the pressurization operation according to a type of the liquid supplied to the pressure chamber.

14. The liquid discharging apparatus according to claim 1, wherein the control portion changes a pressurization force in the pressurization operation according to a type of the liquid supplied to the pressure chamber.

15. A liquid discharging apparatus comprising:

a liquid discharging head discharging liquid from a plurality of nozzles;

a sealing portion configured to seal the plurality of nozzles; and a control portion controlling an operation of the liquid discharging head, wherein the liquid discharging head has a plurality of individual flow paths each having a pressure chamber that communicates with at least one of the plurality of nozzles, a common supply flow path that communicates in common with the plurality of individual flow paths and supplies the liquid to the plurality of individual flow paths, and the control portion controls (i) a discharging operation of discharging the liquid from the plurality of nozzles by driving an energy generation element that causes a pressure of the liquid inside the pressure chamber to fluctuate, and (ii) a pressurization operation of pressurizing the liquid from the individual flow path side in a state in which the plurality of nozzles are sealed by the sealing portion, wherein the liquid discharging head further includes a common exhaust flow path that communicates in common with the plurality of individual flow paths and exhausts the liquid flowing in from the plurality of individual flow paths, the pressurization operation includes pressurizing the liquid from the common exhaust flow path side in the state in which the plurality of nozzles are sealed, and the control portion controls such that a pressurization force when the liquid is pressurized from the common exhaust flow path side in the state in which the plurality of nozzles are sealed in the pressurization operation exceeds a pressurization force when meniscuses in the plurality of nozzles collapse in a state in which the plurality of nozzles are not sealed.

16. A liquid discharging apparatus comprising:

a liquid discharging head discharging liquid from a plurality of nozzles;

a sealing portion configured to seal the plurality of nozzles; and a control portion controlling an operation of the liquid discharging head, wherein the liquid discharging head has a plurality of individual flow paths each having a pressure chamber that communicates with at least one of the plurality of nozzles, a common supply flow path that communicates in common with the plurality of individual flow paths and supplies the liquid to the plurality of individual flow paths, and the control portion controls (i) a discharging operation of discharging the liquid from the plurality of nozzles by driving an energy generation element that causes a pressure of the liquid inside the pressure chamber to fluctuate, and (ii) a pressurization operation of pressurizing the liquid from the individual flow path side in a state in which the plurality of nozzles are sealed by the sealing portion, wherein the liquid discharging head further includes a common exhaust flow path that communicates in common with the plurality of individual flow paths and exhausts the liquid flowing in from the plurality of individual flow paths, the pressurization operation includes pressurizing the liquid from the common exhaust flow path side in the state in which the plurality of nozzles are sealed, and the control portion controls to perform depressurizing the liquid from the common supply flow path side while pressurizing the liquid from the common exhaust flow path side in the state in which the plurality of nozzles are sealed in the pressurization operation.

* * * * *